United States Patent
Dutcher et al.

(10) Patent No.: US 8,701,600 B2
(45) Date of Patent: Apr. 22, 2014

(54) RADIAL-SHAPE WIRELESS DOG FENCE SYSTEM AND METHOD WITH REDUCED CLOCK SPEED VARIATION BETWEEN BASE UNIT AND COLLAR

(75) Inventors: Alan Paul Dutcher, West Deptford, NJ (US); Robert Theodore Cruz, Lititz, PA (US); Gary Roulston, Lititz, PA (US)

(73) Assignee: Woodstream Corporation, Lititz, PA (US)

(*) Notice: Subject to any disclaimer, the term of this patent is extended or adjusted under 35 U.S.C. 154(b) by 21 days.

(21) Appl. No.: 13/618,253

(22) Filed: Sep. 14, 2012

(65) Prior Publication Data

US 2013/0092098 A1    Apr. 18, 2013

Related U.S. Application Data

(63) Continuation-in-part of application No. 12/926,668, filed on Dec. 2, 2010, now Pat. No. 8,297,233.

(60) Provisional application No. 61/282,727, filed on Mar. 23, 2010.

(51) Int. Cl.
*A01K 15/04*    (2006.01)

(52) U.S. Cl.
USPC ............................ 119/721; 119/719; 119/720

(58) Field of Classification Search
USPC .......................... 119/712, 718, 719, 720, 721
See application file for complete search history.

(56) References Cited

U.S. PATENT DOCUMENTS

| | | |
|---|---|---|
| 5,642,690 A | 7/1997 | Calabrese et al. |
| 5,844,489 A | 12/1998 | Yarnall, Jr. et al. |
| 5,933,079 A | 8/1999 | Frink |
| 6,019,066 A | 2/2000 | Taylor |
| 6,166,643 A | 12/2000 | Janning et al. |
| 6,230,031 B1 | 5/2001 | Barber |
| 6,404,338 B1 | 6/2002 | Koslar |
| 6,415,742 B1 | 7/2002 | Lee et al. |
| 6,700,492 B2 | 3/2004 | Touchton et al. |
| 6,825,768 B2 | 11/2004 | Stapelfeld et al. |
| 7,142,167 B2 * | 11/2006 | Rochelle et al. ............... 343/867 |
| 7,173,535 B2 | 2/2007 | Bach et al. |
| 7,259,718 B2 | 8/2007 | Patterson et al. |
| 7,275,502 B2 | 10/2007 | Boyd et al. |
| 7,477,155 B2 | 1/2009 | Bach et al. |
| 7,518,522 B2 | 4/2009 | So |
| 7,546,817 B2 | 6/2009 | Moore |
| 2003/0179140 A1 | 9/2003 | Patterson et al. |
| 2004/0108939 A1 | 6/2004 | Giunta |
| 2006/0112901 A1 | 6/2006 | Gomez |
| 2007/0103296 A1 | 5/2007 | Paessel et al. |
| 2007/0249470 A1 | 10/2007 | Niva et al. |

(Continued)

FOREIGN PATENT DOCUMENTS

WO    WO 2008/085812    7/2008

*Primary Examiner* — Monica Williams
(74) *Attorney, Agent, or Firm* — Jacobson Holman PLLC

(57) ABSTRACT

A radial-shaped wireless fence system is provided that contains one or more dogs in a user-defined area without the need for a physical fence or underground wire. The system includes a base unit and at least one collar, and is easy to set up and use. Each of the base unit and the one collar include a component for reducing clock speed variation between the base and collar units, preferably to +/−5 ppm, to effectively eliminate communication errors between the base and collar units.

11 Claims, 22 Drawing Sheets

(56) References Cited

U.S. PATENT DOCUMENTS

| | | |
|---|---|---|
| 2008/0156277 A1 | 7/2008 | Mainini et al. |
| 2008/0186197 A1 | 8/2008 | Rochelle et al. |
| 2010/0033339 A1 | 2/2010 | Gurley et al. |
| 2012/0132151 A1* | 5/2012 | Touchton et al. ............. 119/720 |

* cited by examiner

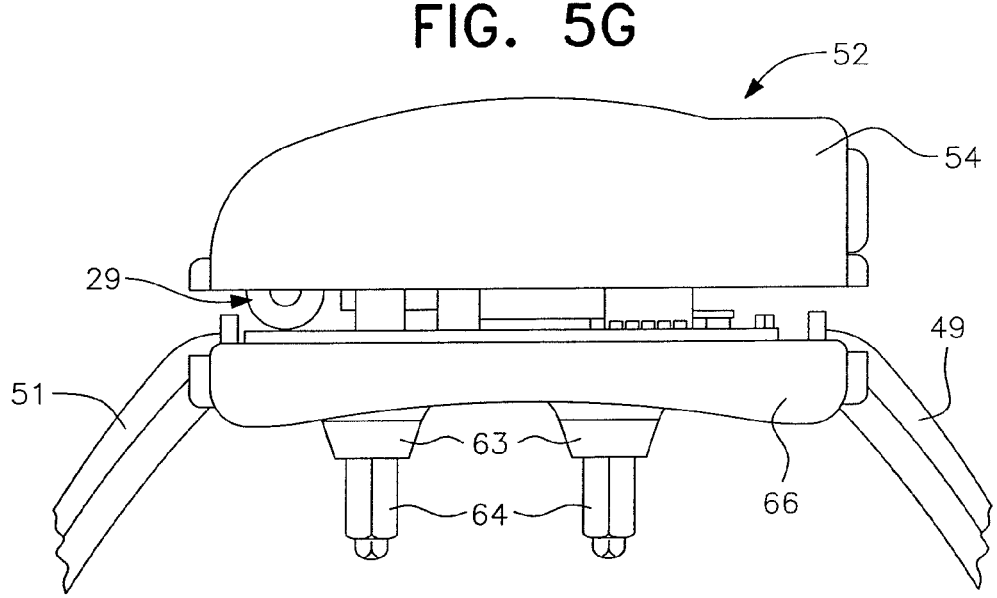
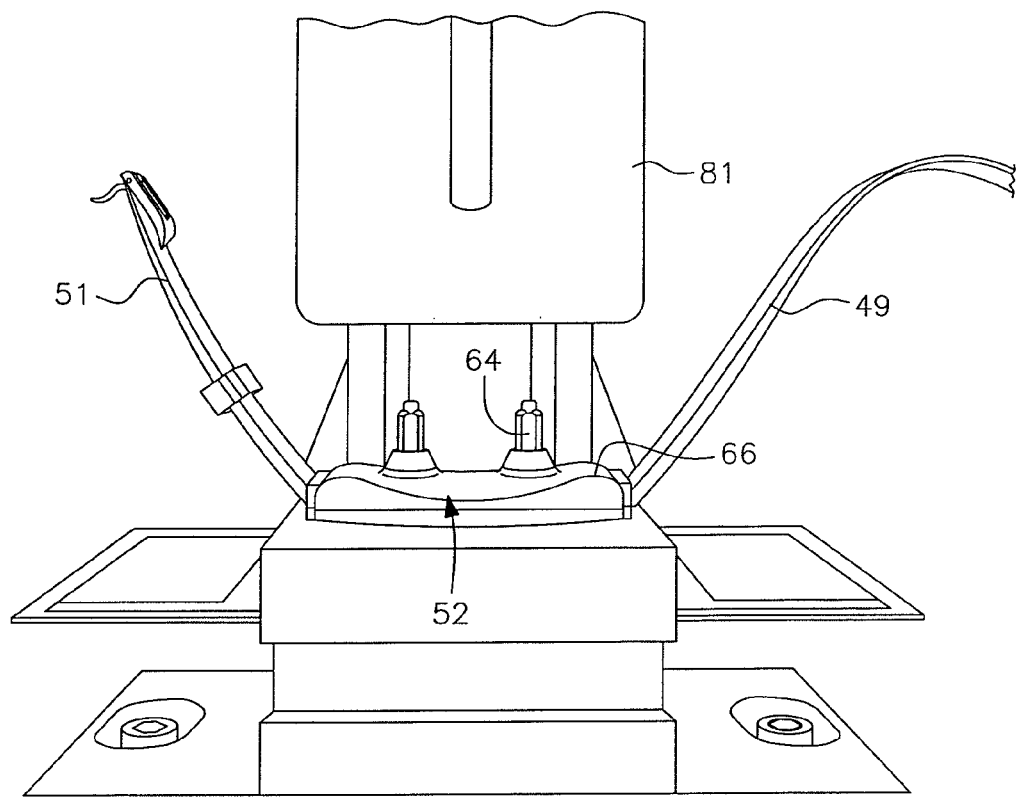

Crystal Oscillator, with Trimmer
Capacitor Cexternal=9pF

Crystal Oscillator, with Temperature Compensated Crystal Cexternal=9pF

Trimmer Capacitor

TCXO

FIG. 10

System Monitoring Mode

80

The Base displays the following System parameters

▫ Collar Battery Charge Status for each collar
▫ Distance Value between Collar and Base
▫ Breach Alert A Breach is defined by DV is
greater than or equal to Fence Distance Value.

82

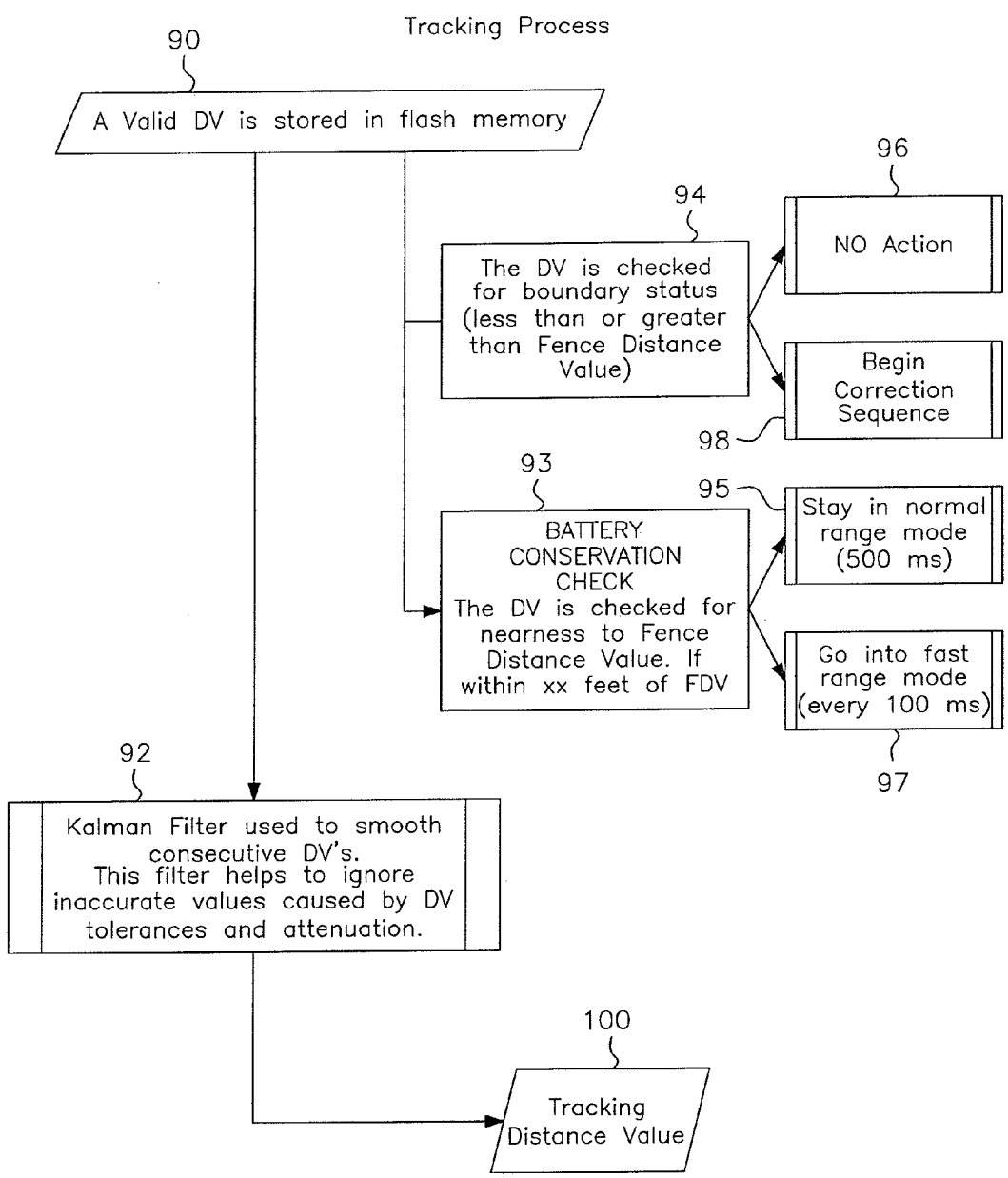

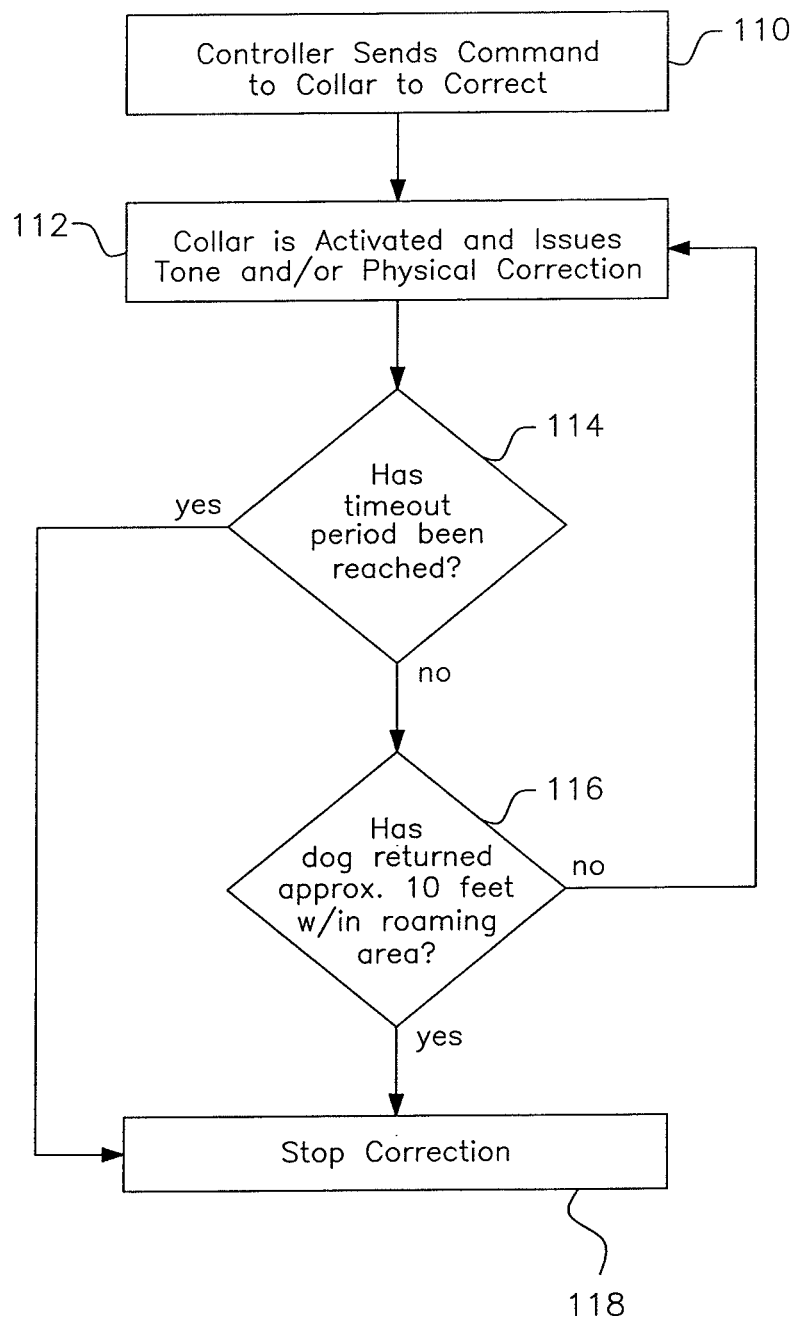

RADIAL-SHAPE WIRELESS DOG FENCE SYSTEM AND METHOD WITH REDUCED CLOCK SPEED VARIATION BETWEEN BASE UNIT AND COLLAR

This application is a continuation in part application of application Ser. No. 12/926,668, filed Dec. 2, 2010, now U.S. Pat. No. 8,297,233 which claims the priority of U.S. Provisional application, Ser. No. 61/282,727, filed Mar. 23, 2010, the priority of which is hereby claimed.

BACKGROUND OF THE INVENTION

1. Field of the Invention

The present invention is related to the field of animal containment and, more particularly, to a system and method for defining a wireless dog fence that surrounds a user-defined area and for using the fence to contain one or more dogs within the user-defined area.

2. Description of the Related Art

Containing one or more dogs within a prescribed area has been achieved in many different ways, most traditionally through the construction of a fenced enclosure that is high enough to prevent the dog from escaping the enclosure by going over the fence. Since some consider above-ground fencing to be unattractive or otherwise undesirable, "invisible" fence products have been developed that rely on a wire buried underground that defines a desired "fence" border for the dog or dogs. The wire transmits a signal that activates a specially designed collar worn by the dog when the dog comes within a certain proximity of the border. The collar, once activated, can issue an audible warning and/or an electric shock to the dog to ensure that the dog does not leave the "fenced-in" area. Buried wire systems are labor intensive to install. Further, since the wire may be unintentionally cut, or otherwise damaged, such as by digging or tilling during lawn maintenance or the like, such buried wire fence systems are also labor intensive when attempting to find the location of the broken wire or other difficulty.

More recently, wireless fence products have been developed that radiate a low frequency signal to saturate a spherical volume which translates to a generally circular area on the ground plane. The radius of the circle is user-definable and, according to one such product manufactured by PetSafe, generally extends radially from about 5 feet to about 90 feet. When the dog, while wearing a specially designed collar, is "inside" the signal saturated area, the collar receives a signal and no action is taken. When the dog moves outside the signal area, however, the collar delivers a correction signal.

Another wireless system is that marketed by Perimeter Technologies, Inc. which, rather than creating a signal-saturated area, uses a distance measuring technology between the collar and a base unit to determine the range of the dog from the base unit. However, interference created by objects often found within a household environment can cause the collar and base to lose communication with one another, resulting in artificially high range values caused by attenuation or reflection, and/or undesired corrections being delivered to the dog, i.e., corrections when the animal is within the defined containment radius.

Precision matching of the clock rate or clock speed of the collar and base components is also a problem. Normal RF practice for a wireless fence circuit calls for +/−40 ppm for adequate control, which equates to a clock speed of 32 MHz+/−1280 Hz. However, this level of control has been found to be inadequate to produce an acceptable yield of product free of Received Signal Strength Indication (RSSI) failures. RSSI failures occur when there is a mismatch between the nominal 32 MHz clock frequencies of the base and collar components.

Accordingly, a need exists for an improved wireless fencing system that is easy for the consumer to set up and use and that overcomes the problems encountered with prior art systems.

SUMMARY OF THE INVENTION

In view of the foregoing, one object of the present invention is to overcome the difficulties of containing a dog within a wireless fence boundary without administering unwanted corrections to the animal.

Another object of the present invention is to provide a wireless fence system having a dual-antenna base unit and a dual-antenna collar to improve the ratio of successfully received signal transmissions to lost signals.

A further object of the present invention is to provide a wireless fence system in accordance with the preceding objects in which distance values are repeatedly obtained between the base unit and the collar and then weighted and filtered to discount those distance values likely to be errant and to track more accurately the range of the dog from the base unit.

A still further object of the present invention is to provide a wireless fence system in accordance with the preceding objects in which NANOLOC™ chipsets are used in conjunction with a power amplification circuitry to provide greater signal strength for improved reliability in tracking the dog within the fence boundary.

Yet another object of the present invention is to provide a wireless fence system in accordance with the preceding objects that provides increased precision in the control of the clock speed in each of the base unit and collar so that these units can be "matched" for a given clock speed.

A still further object of the present invention is to provide a wireless fence system in accordance with the preceding objects in which the NANOLOC™ RF circuitry of the collar and/or the base unit is modified to include an external trimmable capacitor which enables the oscillator frequency to be manually adjusted to achieve a total range precision of 10 ppm (+/−5 ppm), which equates to a clock speed of 32 MHz+/−160 Hz, effectively eliminating communication errors between the base unit and the collar of the fence system.

Another object of the present invention is to provide a wireless fence system in accordance with the preceding objects in which a standard crystal oscillator within the NANOLOC™ RF circuitry of the collar and/or the base unit is replaced with a temperature compensated crystal oscillator (TCXO) to provide increased precision in the control of the clock speed variation between the base unit and the collar over a wide temperature range.

Yet another object of the present invention is to provide a wireless fence system in accordance with the preceding objects in which the tracking process of the system includes a normal battery conservation mode and an accelerated mode during which the distance value sampling rate is increased in response to the dog's proximity to the fence boundary.

It is yet another object of the invention to provide a wireless pet containment product that is user friendly and robust in operation and which effectively tracks the distance between a base unit and the dog to reduce the number of inappropriate corrections administered to the dog.

In accordance with these and other objects, the present invention is directed to a radial-shape wireless fence system for containing one or more dogs in a user-defined area without the need for a physical fence or underground buried wire. As used herein, "radial-shape" refers to a generally circular area defined by a border that encircles a center point defined by the location of the base unit. The border represents an approximate area within which the collar will begin to initiate a correction to the dog. This border area marks the start of a trigger zone which extends outwardly from the border in all directions to a distance at which the collar can no longer receive input from the base unit. This distance, and hence the "size" of the trigger zone, will vary depending upon the terrain and objects between the dog and the base unit, but can be as much as about a mile and a half from the base unit in open flat country. The fence radius, which is set by the user, is the distance between the base unit and the border and defines a roaming area. As long as the dog remains within the roaming area, signal transmissions are effectively sent and received between the base unit and the collar to monitor the dog's range from the base unit in real time, and no corrections are issued to the dog. Under these conditions, the collar may be configured to go to sleep to conserve battery power. In addition, the system may be configured to filter out errant values and/or to take no action if communication is suddenly blocked, such as due to loss of power to the base unit or the collar, or the introduction of a physical signal-blocking element to the system environment.

Also as used herein, the "fence" is an estimated line that runs concentrically with the border of the trigger zone. In the absence of any interference or signal attenuation, the fence would be circular, representing the circumference of a circle defined by the radius. Due to real-world conditions, however, in which signal interference is caused by various objects within the encircled area, or objects anywhere that cause multipath effects, the generally circular roaming area may have segments in which the border or "fence" is closer to the base unit than at other segments, i.e., segments in which the distance between the border/fence and the base unit is less than the fence radius.

The system includes a base unit and at least one collar for a dog, with multiple collars also being supported for additional dogs, which is easy to set up and use. Both the base unit and the collar have two antennas each, providing diversity to improve the ratio of successfully received signal transmissions to lost signals. It is advantageous if each of the base unit and the collar is provided with a PCB-mounted component for reducing clock speed variation between the base unit and the collar.

According to a first embodiment, the component for reducing clock speed variation is a manually adjustable trimmable capacitor incorporated within the RF circuitry of both the base unit and the collar. The trimmable capacitor can be adjusted to obtain a closely matched clock speed between the base unit and the collar, virtually eliminating communication errors between these two units.

In a second embodiment, the component for reducing clock speed variation is a temperature compensated crystal oscillator (TCXO). The TCXO provides increased precision in the control of the matched clock speed over a wide temperature range and thus is typically most useful in the collar circuitry where the dog wearing the collar may be indoors or outdoors. While the base unit may be configured with either a trimmable capacitor as in the first embodiment or with a TCXO, the trimmable capacitor is generally preferred since the base unit is typically mounted indoors and therefore is not subject to large temperature fluctuations.

The base unit is mounted inside the user's house or other desired indoor location. By following a set-up menu on a display screen and using input elements on the base unit, the user enters a desired fence radius. The user then verifies the desired fence radius by walking outwardly from the base unit with the collar, noting when the collar outputs a signal indicating proximity to the trigger zone and placing a flag or other marker at that location. The user then walks back into the roaming area, moves laterally, and then walks back outwardly until the collar again signals proximity to the trigger zone at which point the user sets another flag or marker. This process is continued until the complete border has been marked with the flags or markers. Using these flags as visual cues of the location of the "fence", and with the collar on the dog, the user can then train the dog where the fence border is so that the dog can be effectively contained therein.

Once the fence has been set up and the dog trained, the system operates by continuously obtaining distance values between the base unit and the collar in order to track the distance of the dog from the base unit on a real time basis. These distance values are weighted and filtered to discount those distance values likely to be errant due to their disparity with previously measured values and previous calculated estimates of the dog's position. More particularly, through weighting and filtering of a plurality of continuously obtained distance measurement values taken between the base unit and the collar, anomalous measurement values are discounted in terms of their contribution to the current estimate of the dog's location. These filtering techniques in combination with improved signal strength and antenna diversity in the communication between the base unit and the collar improve the accuracy with which the dog's range from the base unit is tracked so that unwanted corrections are not administered to the dog.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5G is a photograph of the collar components shown in FIG. 5F, as the upper housing is brought into engagement with the lower housing to seal the correction unit compartment.

FIG. 5H is a photograph of the collar components shown in FIGS. 5F and 5G with the correction unit compartment positioned for sealing in an ultrasonic welding machine.

FIG. 10 is a flowchart showing the steps taken during the system monitoring mode of the system shown in FIG. 1.

FIG. 11 is a flowchart showing the steps taken during the tracking process of the system shown in FIG. 1.

FIG. 12 is a flowchart showing the steps taken during the correction process of the system shown in FIG. 1.

DETAILED DESCRIPTION OF THE PREFERRED EMBODIMENTS

Figure 1:
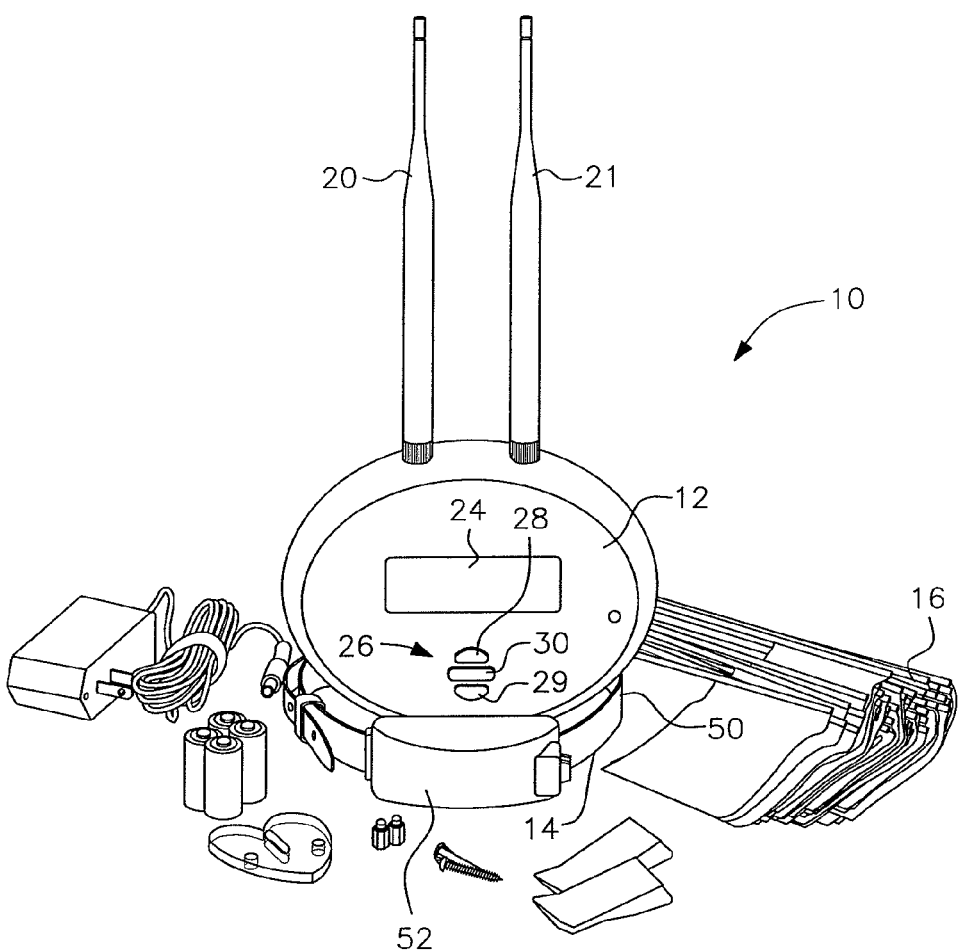
FIG. 1 shows the components of a radial-shape wireless fence system in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

According to the present invention generally designated by reference numeral 10, a radial-shape wireless fence system is provided that includes a base controller unit 12 and a remote unit, generally embodied as a collar 14, as shown in FIG. 1. For the purposes of training the dog and to provide visual markers for both the dog and the user that generally correspond with the fence border, a set of flags 16 is also preferably provided with the system. The number of flags may be variable, but it is preferred to have from about 25 to about 100 flags, depending upon the radius of the containment or roaming area 32 (see FIG. 3) to be defined.

Figure 2:
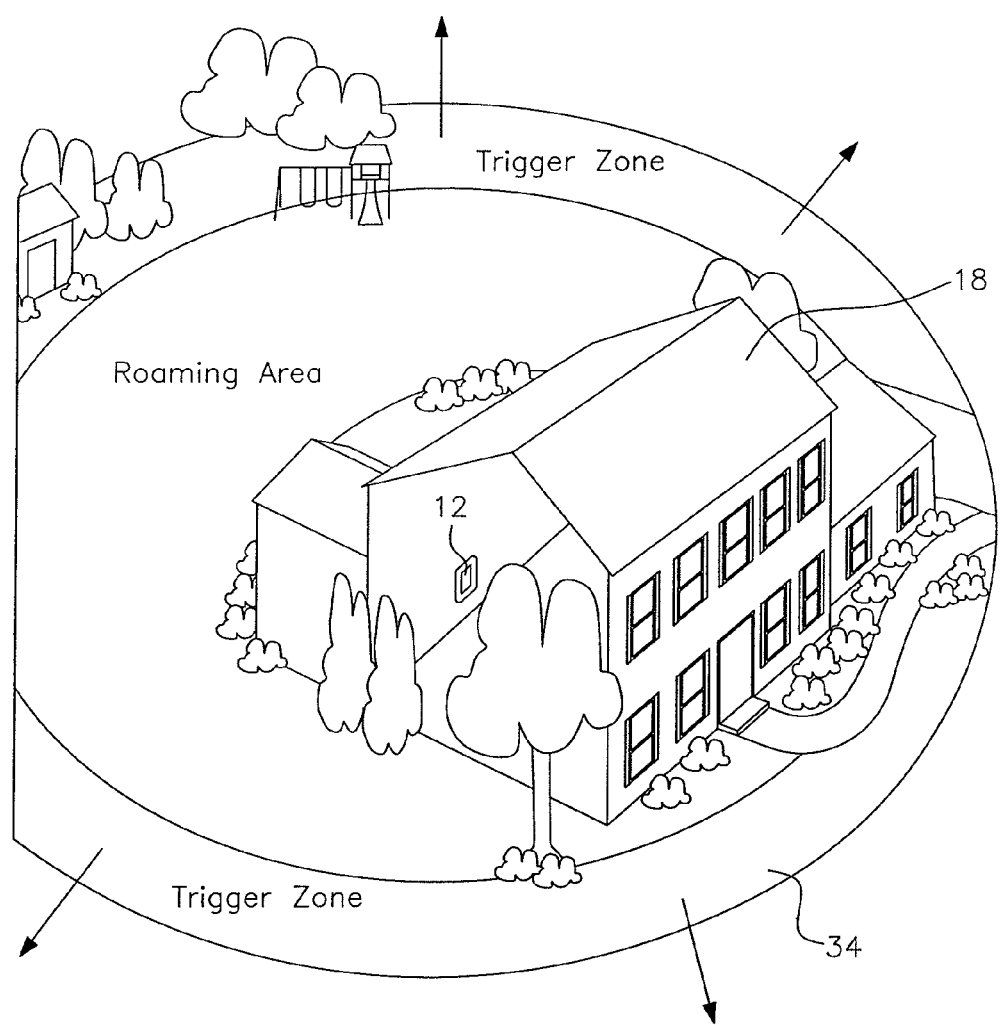
FIG. 2 illustrates the base unit shown in FIG. 1 as mounted inside a house to define a roaming area and the trigger zone.

As shown in FIG. 2, the base unit 12 is intended to be positioned within the user's home 18, garage, or other environmentally controlled, indoor area, and is preferably configured to be mounted on a wall. While it is possible to power the base unit with batteries, it is preferably plugged into a properly grounded 120V AC outlet. The base unit has two antennas 20, 21 for diversity when communicating with the collar 14, a display screen 24 (preferably LCD) and input elements or buttons, generally designated by reference numeral 26, for inputting information to set up and control the system. According to a preferred embodiment, the input elements include up and down arrow keys 28, 29 and an enter button 30.

The base unit communicates with the collar using an integrated circuit (IC) chip contained within the base unit and within the collar. According to a preferred embodiment, the chipset is a NANOLOC™ TRX 2.4 GHz transceiver chipset sold by Nanotron Technologies of Berlin, Germany. The NANOLOC™ TRX 2.4 GHz transceiver chipset is an IEEE 802.15.4a chirp spread spectrum radio module with indoor and outdoor ranging capabilities. Other chipsets that use the IEEE 802.15.4a chirping technique for radio frequency distance measurement could also be used.

Figure 3:
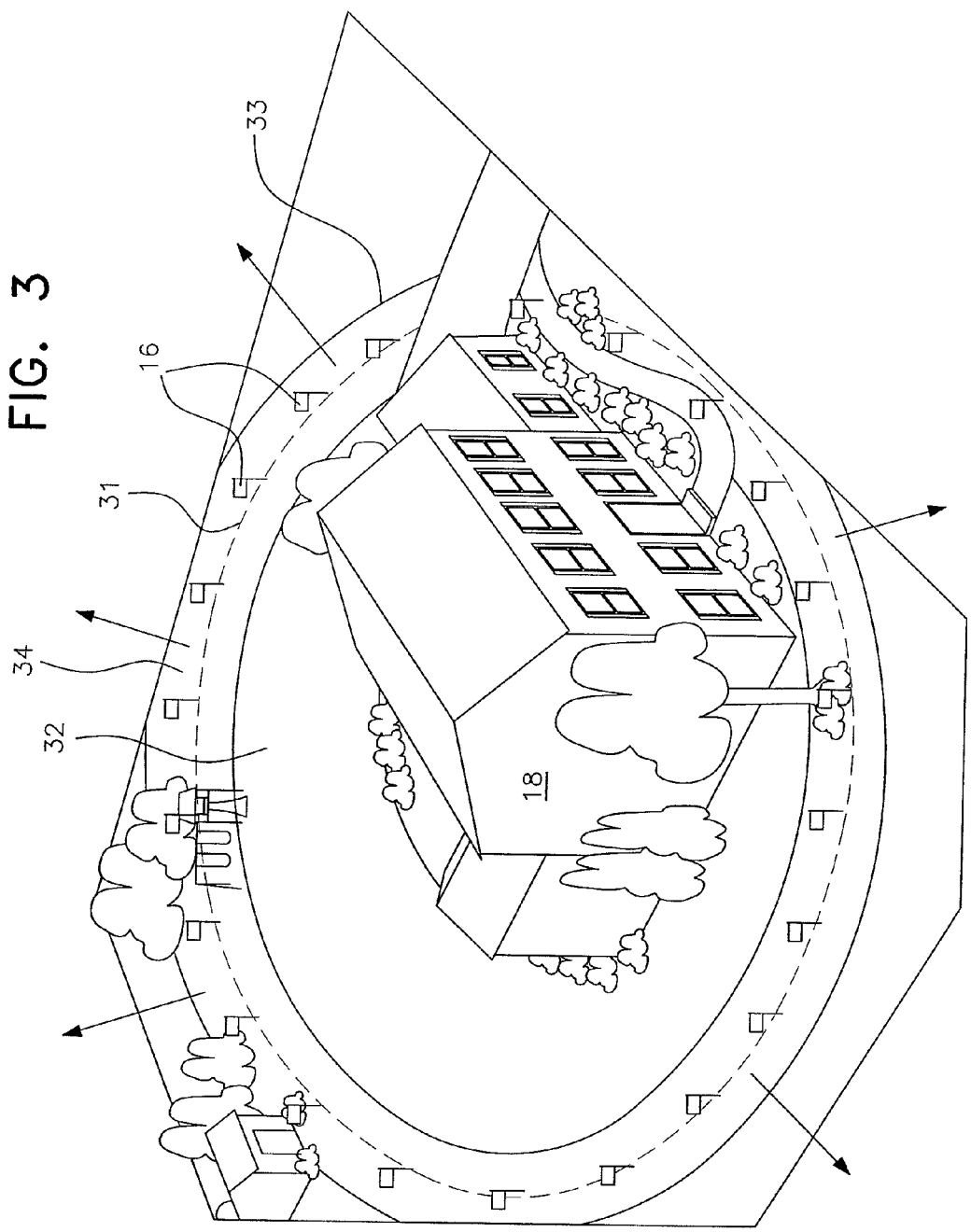
FIG. 3 illustrates the fence border and outlying trigger zone of the system set-up shown in FIG. 2.

The base unit 12 is configured to enable the user to set up a fence radius of from about 40 to about 400 feet. As noted previously, the radius establishes the distance to the "fence" 31 (see FIG. 3) which encloses the inner roaming area 32 and establishes the border at which the trigger zone 34 begins. While the trigger zone appears to be an annular area or ring 33 as shown in FIG. 3, the ring 33 actually represents the fact that there is generally some leeway or cushion in the exact location of the border 31 as compared to the fence radius set by the user, due to signal interference and attenuation caused by real-world conditions as already noted. Hence, the point at which a correction is actually initiated could be within or on either the inner or outer edges of the annular area 33.

Figure 4:
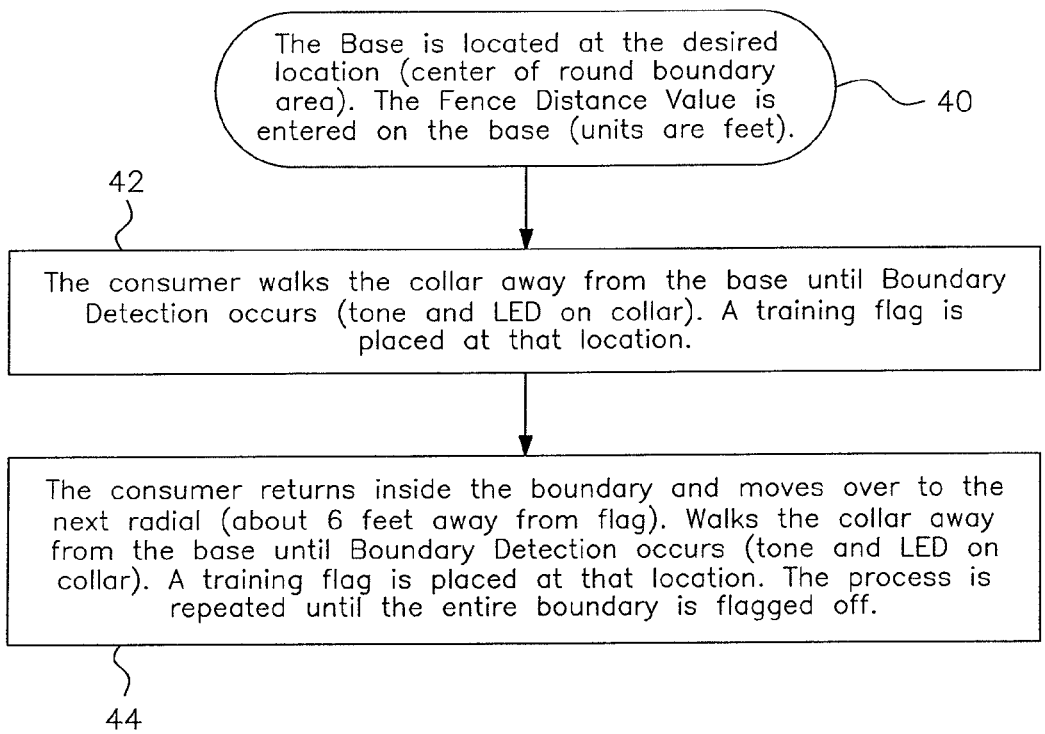
FIG. 4 is a flowchart showing the steps taken during the fence setting mode of the system shown in FIG. 1.

As summarized in FIG. 4, during the fence setting mode, the base unit is located at the center of the desired radial-shaped area to be set up, step 40. The user enters the desired fence radius into the base unit, step 40, following a set-up menu displayed on the display screen and using the input elements or buttons 26 to select the desired parameters. Once the radius has been entered, the user walks to the border with the collar to verify that the desired radius has been set by noting where the collar reacts indicating proximity to the trigger zone 34 and places a training flag at that location to define the fence 31, step 42. The remainder of the border or fence 31 is flagged off by the user as described in step 44.

Figure 5A:
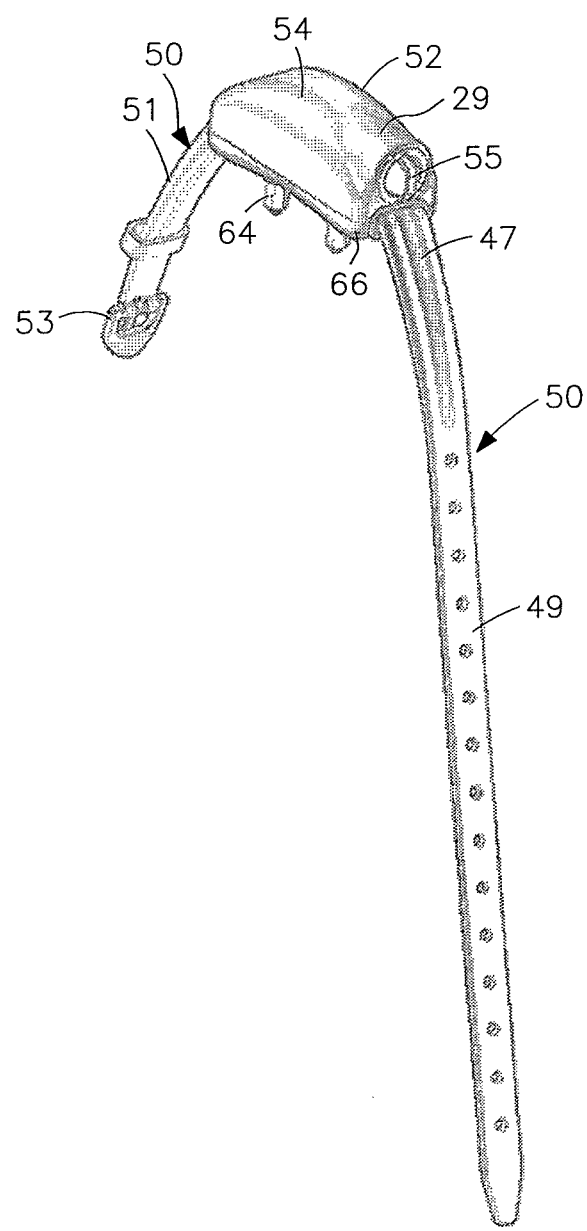
FIG. 5A is an isolated view of the assembled collar shown in FIG. 1.
Figure 5B:
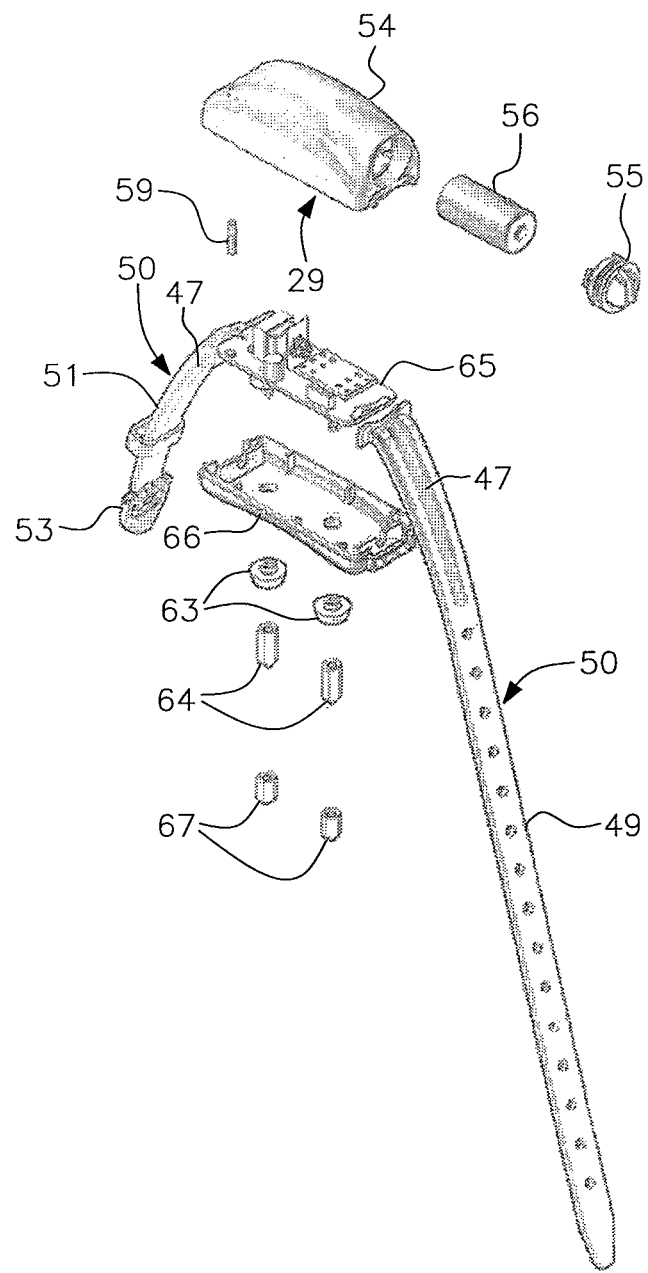
FIG. 5B is an exploded view of the components of the collar shown in FIG. 5A.

As shown in FIGS. 5A and 5B, the collar 14 includes a strap generally designated by reference numeral 50 that is fitted around the dog's neck and a correction unit 52 mounted to the strap 50. The strap 50 includes a first part 49 having holes therein that is coupled to one side of the correction unit 52, and a second part 51 connected to the other side of the correction unit 52 which has a buckle assembly 53 that can be engaged with the holes to secure the collar 14 around the dog's neck.

The correction unit 52 includes a compartment 29 having a lower housing 66 and an upper housing 54 with a cover 55 through which a CR123A battery 56, for example, may be inserted into the compartment 29 for providing power to the unit 52. The correction unit further preferably includes an indicator light, preferably an LED post 59 (see FIG. 5B) joined to the upper housing 54 with a waterproof adhesive, that is visible from the outer side of the correction unit and, like the base unit, the collar has two antennas 60, 61 to provide diversity when communicating with the base unit.

Figure 5C:
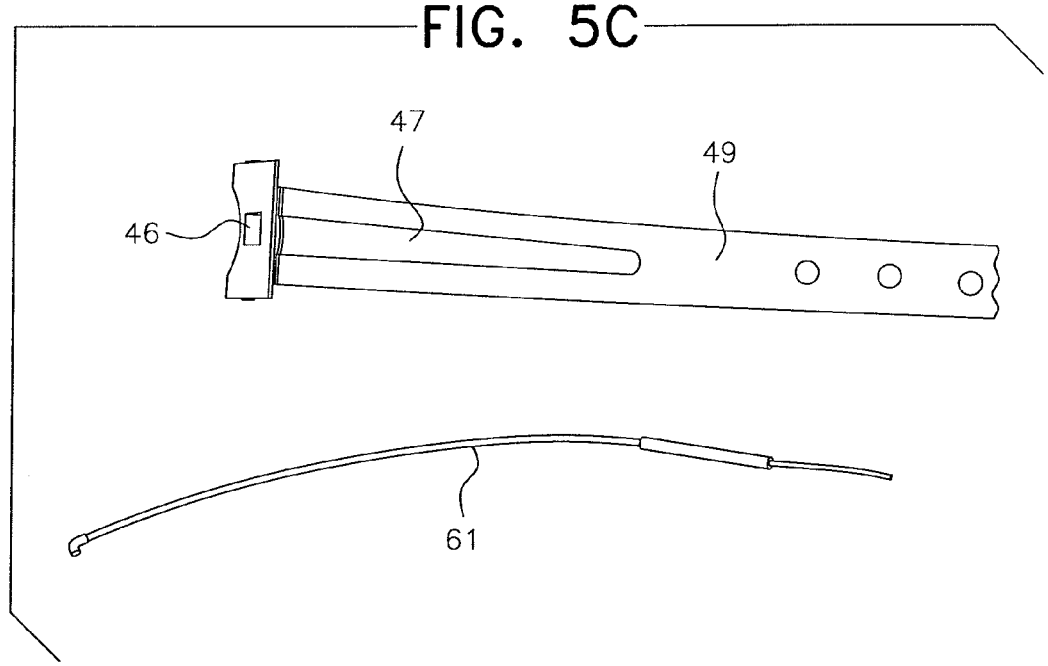
FIG. 5C is a photograph of the first strap part of the collar strap as shown in FIGS. 5A and 5B, and the antenna to be inserted into the hole in an interior end of the strap part.
Figure 5D:
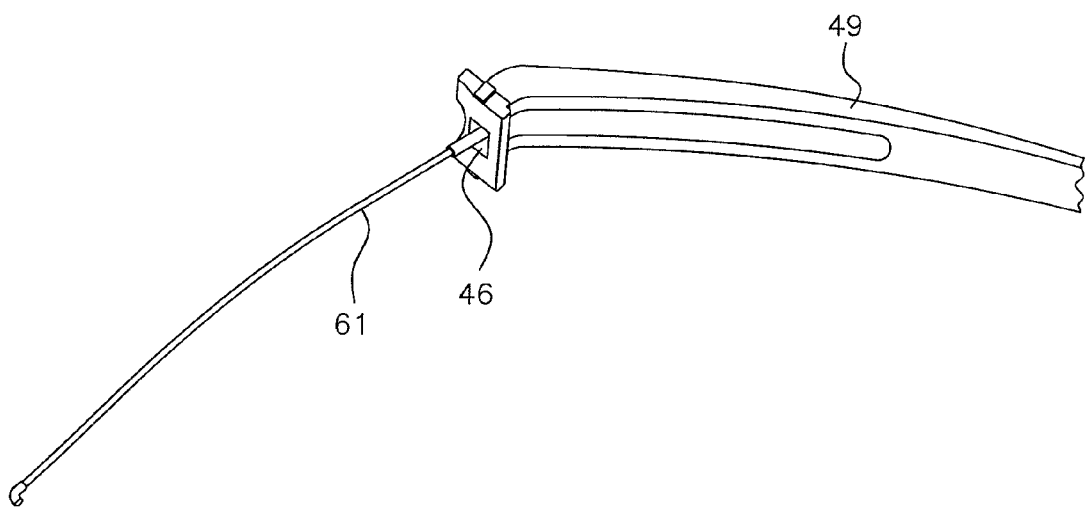
FIG. 5D is a photograph of the components shown in FIG. 5C after the antenna has been inserted into the hole in the strap.

As shown in FIGS. 5C and 5D, the antenna 61 is preferably inserted through an opening 46 and into a blind channel in the collar strap part 49 prior to final assembly of the collar and is secured with silicone or similar material at the strap antenna insertion points. Insertion of antenna 60 into a corresponding hole and channel in strap part 51 is accomplished in like manner.

Housed within the compartment 29 of the collar correction unit 52 is a printed circuit board (PCB) assembly 65 as shown in FIGS. 5B and 5E-5G. A NANOLOC™ TRX 2.4 GHz transceiver chipset like that in the base controller is integrated with the PCB assembly 65 under RF shield 39 (see FIG. 5E). The collar and base unit NANOLOC™ chipsets send and receive radio transmissions from one another like 2-way radios. The NANOLOC™ chipsets are preferably enhanced in operation with power amplification circuitry to provide greater signal strength. When radio signals are sent from the antennas of either the base unit or the collar to the other of the two components, these signals propagate in an omni-directional or spherical manner. Using these signals, the enhanced NANOLOC™ chipsets perform a ranging process with their associated antenna pairs which continuously captures, filters and refines the data to yield the distance between the base unit and the collar at any given time, as will be described further hereinafter.

Two probes 64 extend laterally from the lower housing 66 of the compartment 29 that is against the dog's neck and are insulated from the housing 66 by electrode grommets 63. Shorter probes 67 can be interchangeably mounted to the lower housing 66 to better suit short-haired dogs. Depending upon the setting of the collar, the probes 64, 67 provide a physical correction signal to the dog upon reaching the trigger zone. Alternatively, the collar can be set to provide only an auditory correction signal to the dog. The physical correction signal is preferably adjustable between a plurality of levels to suit the size, age and temperament of the dog. In a preferred embodiment, the collar defaults to a tone-only correction signal.

Figure 5E:
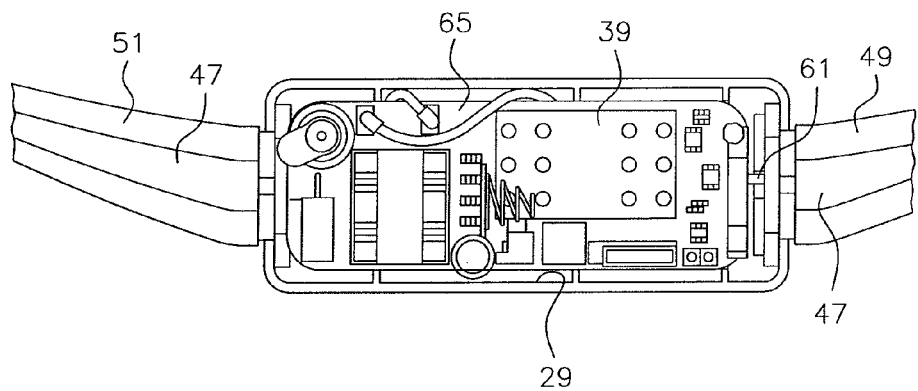
FIG. 5E is a photograph of the printed circuit board shown in FIG. 5B, as mounted in the lower housing and with the collar straps connected thereto.
Figure 5F:
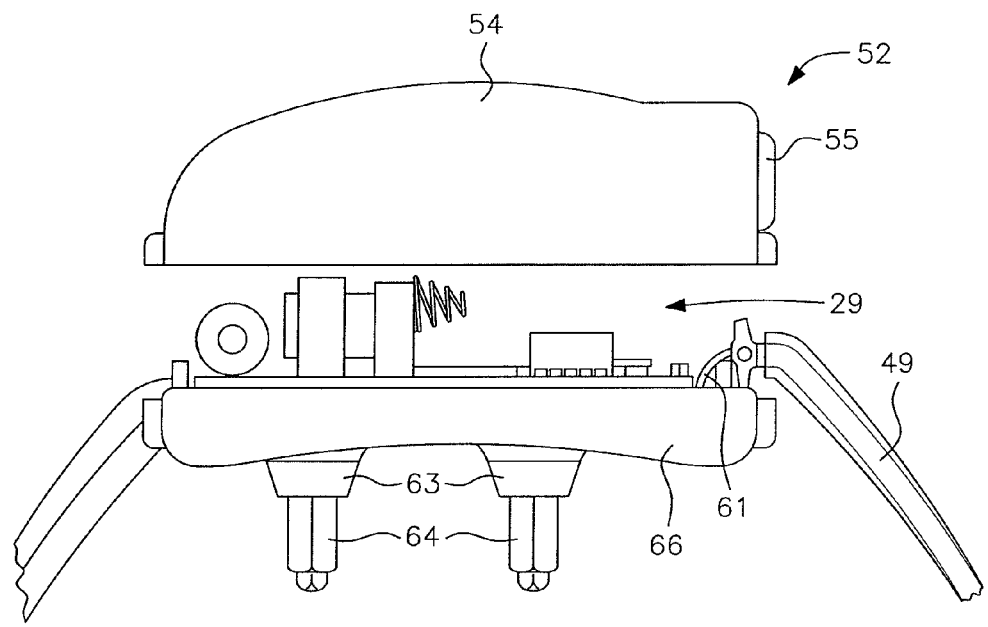
FIG. 5F is a photograph of the collar components shown in FIG. 5B, without the battery, as the upper housing is brought into alignment with the lower housing.

To assemble the collar, the ends of the antennas 60, 61 that extend out of the channels 47 are coupled to connectors on the PCB assembly 65, preferably with a snap-on or push-on fit. The PCB assembly is received within the lower housing 66 with the collar strap parts 49, 51 on either side of the lower housing as shown in FIG. 5E. The upper housing 54 is then brought into alignment with the lower housing as shown in FIG. 5F, and then brought closer to engage with the lower housing as shown in FIG. 5G. Once the upper and lower housing are engaged with one another to ultimately close the compartment 29, the correction unit 52 is sealed, preferably using an ultrasonic welding machine 81 as shown in FIG. 5H. Once fully assembled and welded as shown in FIG. 5A, the collar and correction unit 52 are sufficiently waterproof so as to be able to be submerged for a period of about one minute and thereafter operate at or above 75% of accepted specifications for collar performance.

Figure 6A:
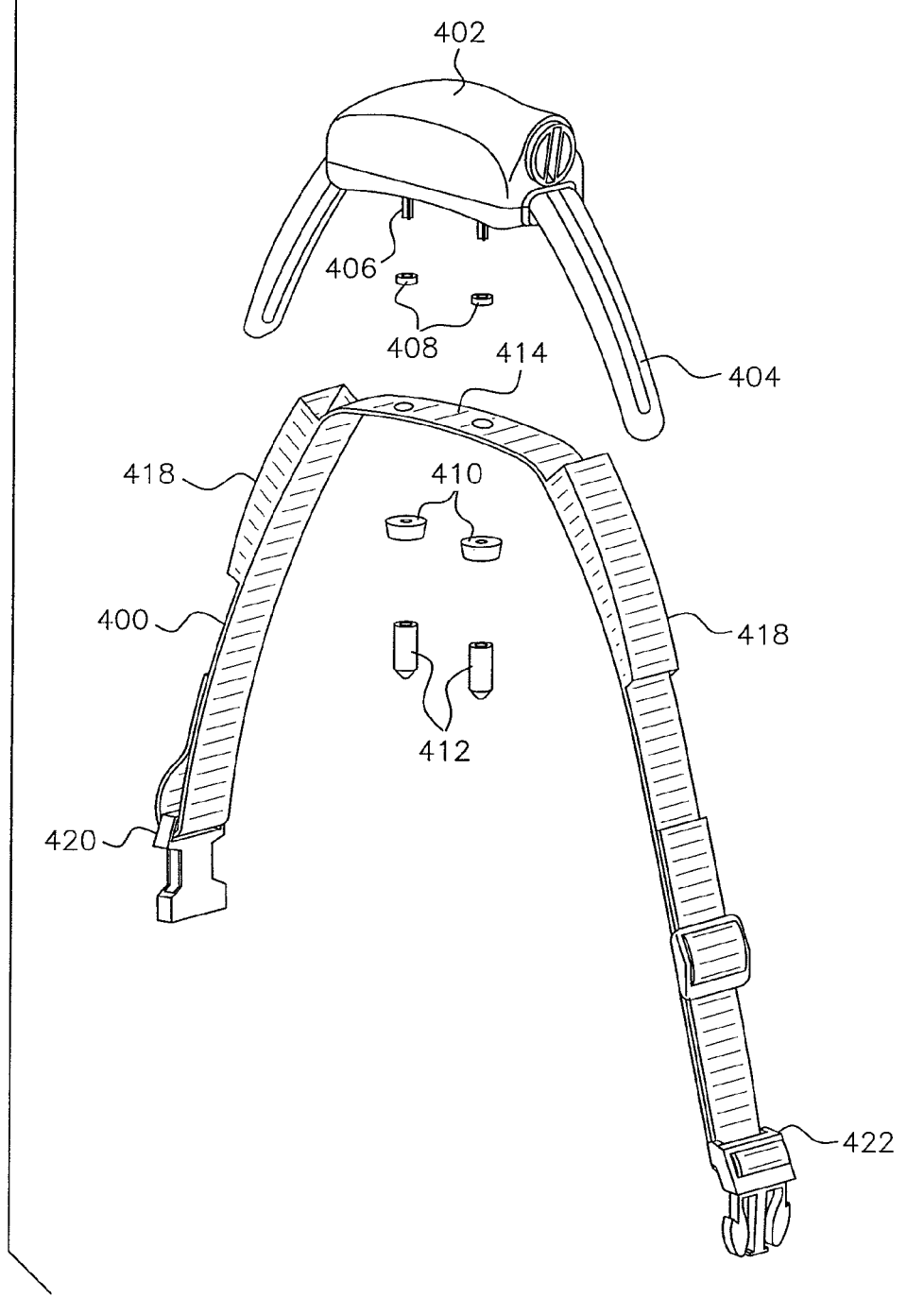
FIG. 6A is an exploded view of the components of a second embodiment of a collar assembly including a collar strap and correction unit for use with the wireless fence system according to the present invention.
Figure 6B:
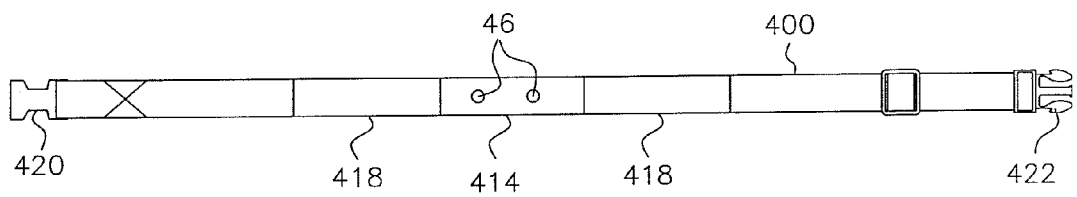
FIG. 6B is a top view of the collar strap shown in FIG. 6A.
Figure 6C:
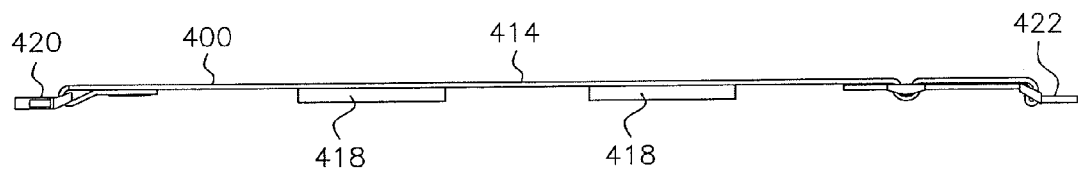
FIG. 6C is a side view of the collar strap shown in FIG. 6A.

The collar may also be embodied with a single strap 400 and a modified correction unit 402 as shown in FIGS. 6A-6C, with the strap being easily removable from the correction unit when required. The antennas 404 projecting from each end of the correction unit 402 are each enclosed within an insulating sleeve to protect the antennas from environmental exposure. The bottom of the correction unit 402 has two screw bosses 406 with insulators 408 onto which electrode grommets 410 and electrodes 412 are secured when the collar is assembled.

In this embodiment, the single strap 400 has a center portion 414 with two spaced cutouts 416 for receiving the insulated screw bosses 406 on the bottom of the correction unit 402. On either side of the center portion 414, the collar is provided with a pocket 418, each pocket 418 receiving one of the sleeved antennas 404 extending from the correction unit 402 when the collar and correction unit are assembled. The strap 400 includes a first end 420 and a second end 422 that are provided with complementary fastening elements to allow the ends 420, 422 of the collar to be secured to one another when the collar is being worn by a dog, as is known in the art. The collar strap may be made of various materials including leather, nylon, polymers, etc., as would also be known by persons of skill in the art.

Figure 6D:
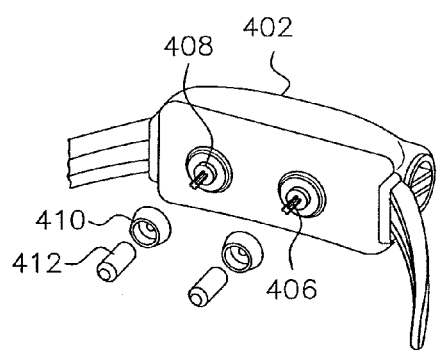
FIGS. 6D through 6J illustrate the sequential steps taken to assemble the correction component and collar strap shown in FIG. 6A.
Figure 6E:
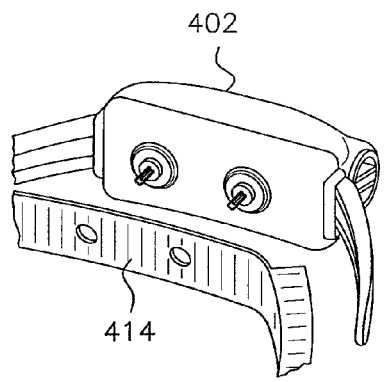
Figure 6F:
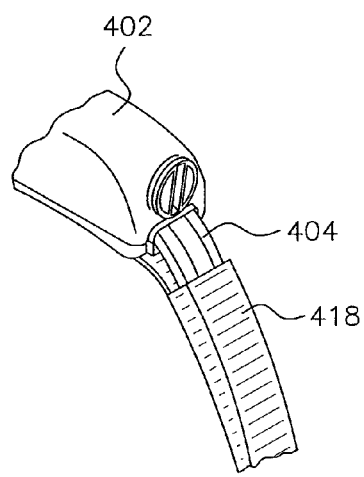
Figure 6G:
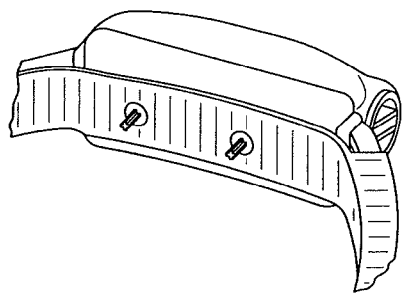
Figure 6H:
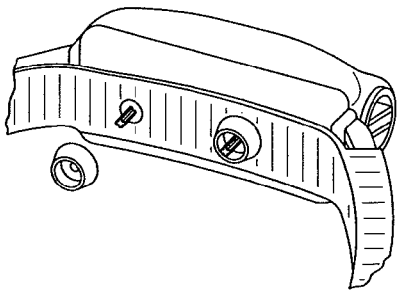
Figure 6I:
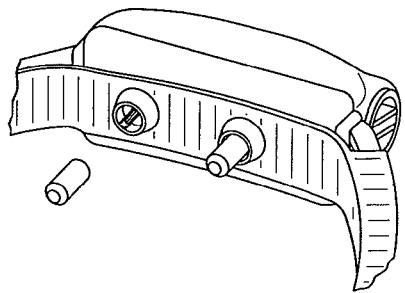
Figure 6J:
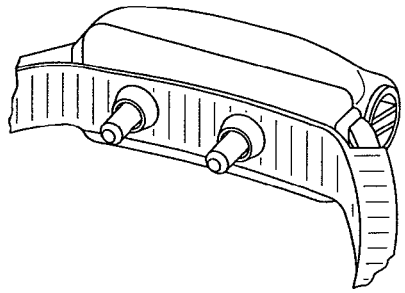

Assembly of the correction unit 402 to the collar 400 of the embodiment shown in FIGS. 6A to 6C is summarized in FIGS. 6D-6J. First, the electrodes 412 and electrode grommets 410 are removed from the screw bosses 406 and the boss insulators 408, as shown in FIG. 6D. The collar strap 400 is positioned with the cutouts 416 in the center portion 414 aligned with the screw bosses 406 on the bottom of the correction unit 402, as shown in FIG. 6E. The sleeved antennas on the correction unit are inserted into the pockets 418 of the collar strap, as shown in FIG. 6F, and the bosses 406 with insulators 408 are inserted through the cutouts 416, making certain that the insulators 408 are inside the cutouts as shown in FIG. 6G. One electrode grommet 410 is then slid onto each screw boss 406 until both grommets 410 are in abutment with the collar strap, as shown in FIG. 6H. An electrode 412 is then screwed onto each screw boss 406 while ensuring that the electrodes 412 are inside the center depression of the grommets 410, as shown in FIG. 6I. Proper assembly of the collar and correction unit is then verified to ensure that the collar is ready for use, as shown in FIG. 6J.

Figure 7A:
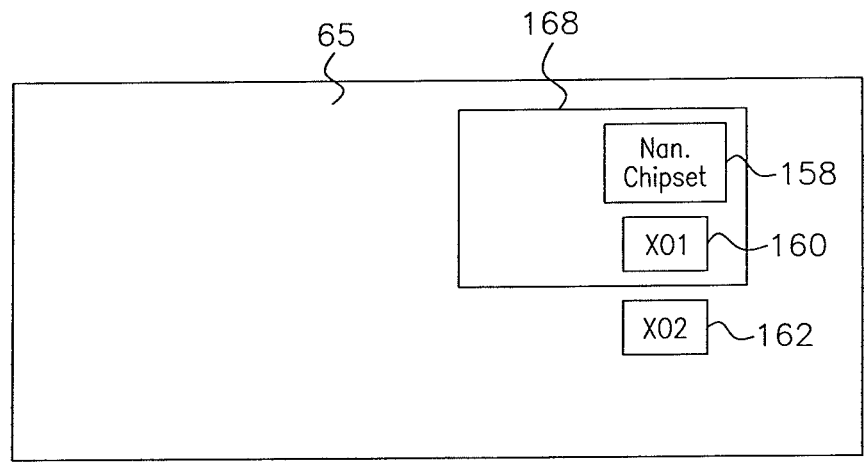
FIG. 7A is a block diagram of a portion of the collar PCB, including the NANOLOC™ chipset, as configured without a component for reducing clock speed variation.

As shown in FIG. 7A, the PCB assembly 65 of the collar includes a PCB 65 with a NANOLOC™ chipset 158, a first crystal oscillator 160 and a second crystal oscillator 162. The first oscillator 160 and the NANOLOC™ chipset are shielded by a tuner can 168. According to a preferred embodiment, the first crystal oscillator has a frequency of 32 MHz and the second crystal oscillator 162 has a frequency of 32 KHz. Crystals having other frequencies could also be used as would be understood by persons of ordinary skill in the art.

Crystals such as the first and second oscillators 160, 162 are manufactured to deliver their specified frequency with a specified amount of external capacitance. However, manufacturers can only realistically deliver a certain amount of precision for a given price. Therefore, it is necessary to minutely adjust the oscillation frequency to meet certain critical applications, such as the ranging requirements of the present invention, which requires a high degree of precision, preferably +/−5 ppm, for the system to operate reliably. According to the present invention, this high degree of precision is obtained by modifying the PCB assembly in one or preferably both of the base unit and the collar to include a component for reducing clock speed variation between the base unit and the collar.

Figure 7B:
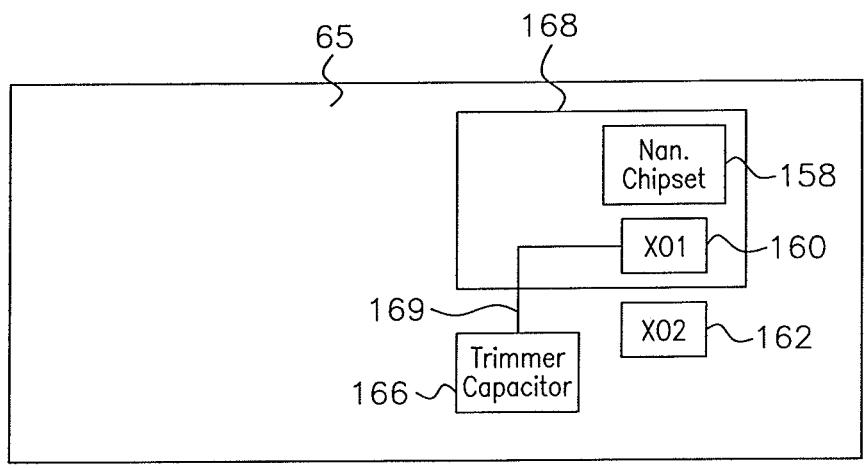
FIG. 7B is a block diagram of the collar PCB shown in FIG. 7A in which a component for reducing clock speed variation in the form of a trimmable capacitor has been added in accordance with the present invention.
Figure 7C:
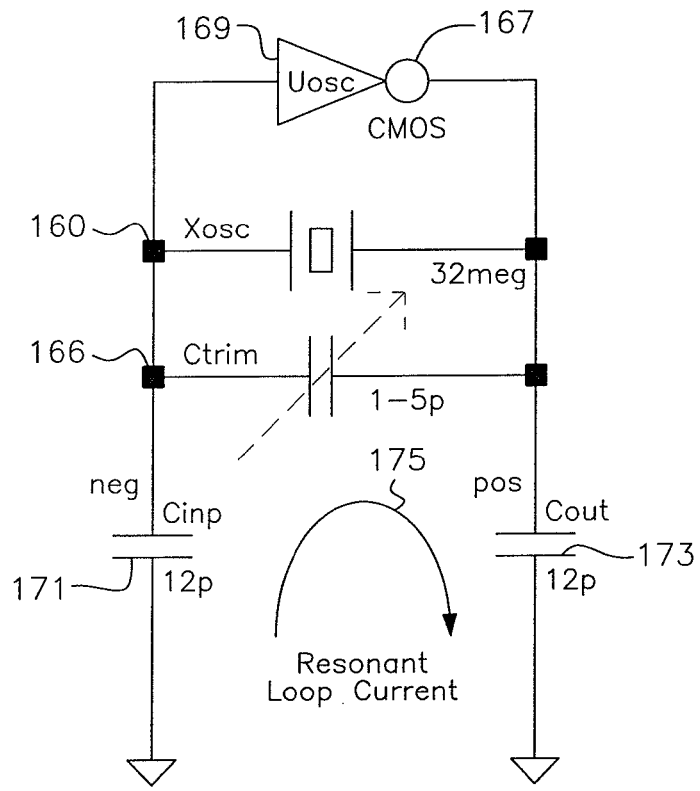
FIG. 7C is a schematic of the circuit including the trimmable capacitor as shown in FIG. 7B.
Figure 7D:
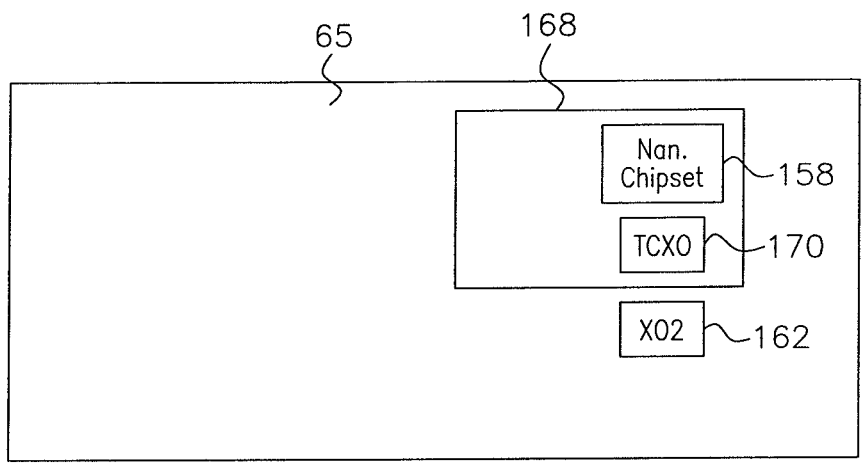
FIG. 7D is a block diagram of the portion of the collar PCB shown in FIG. 7A in which a component for reducing clock speed variation in the form of a temperature compensated crystal oscillator (TCXO) has been substituted for one of the standard oscillators in the RF circuitry in accordance with the present invention.
Figure 7E:
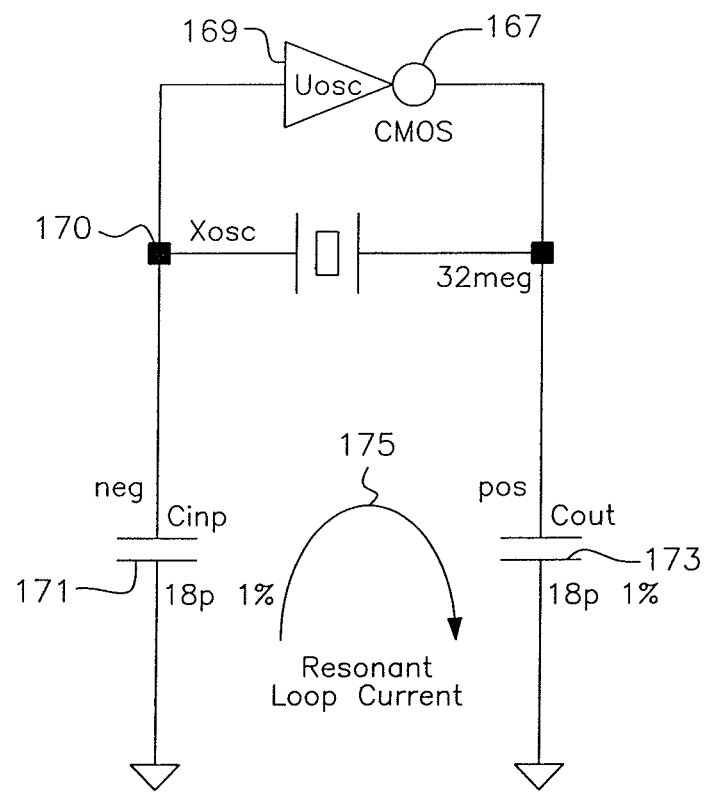
FIG. 7E is a schematic of the circuit including the TCXO shown in FIG. 7D.
Figure 7F:
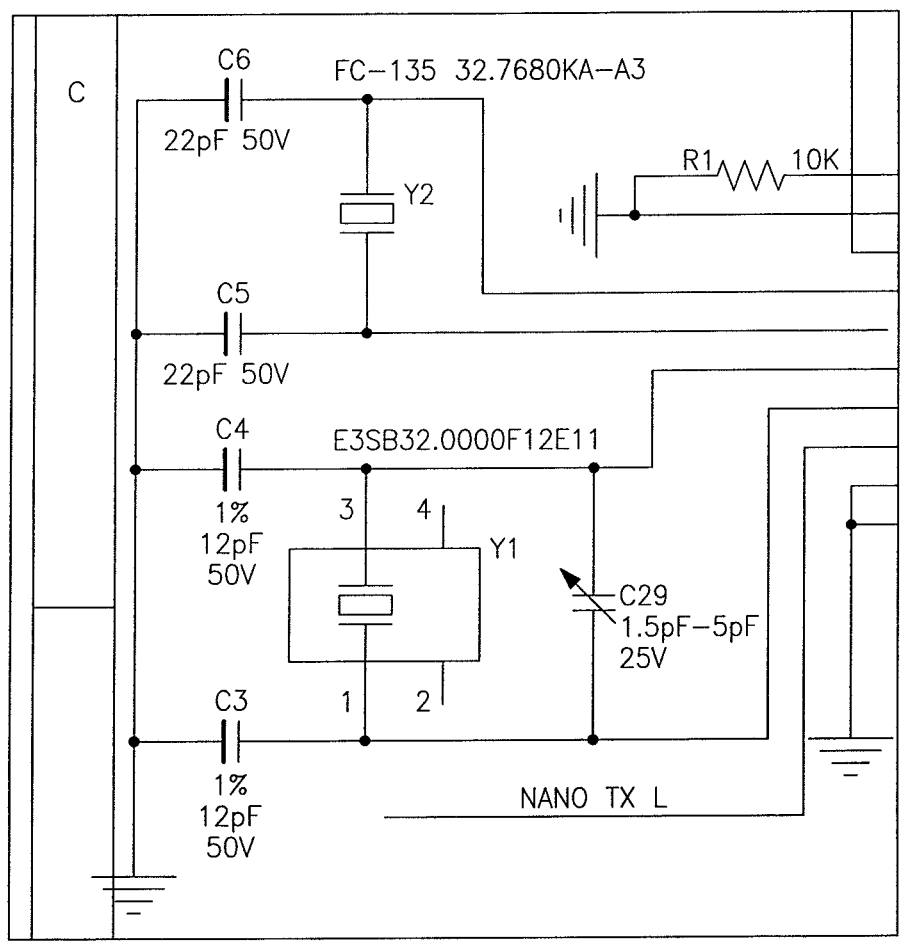
FIG. 7F is a more detailed schematic of the trimmer capacitor circuit in accordance with the present invention.

According to a first collar modification embodiment shown in FIGS. 7B, 7C and 7F, the component for reducing clock speed variation is a trimmer component, preferably a trimmable capacitor 166. As used herein, the terms "trimmer capacitor", "trimmable capacitor" and "trimmer" are used interchangeably. The trimmer capacitor is used to fine-tune the frequency variation of the first crystal oscillator 160.

The resonant frequency of the crystal oscillator is affected by its internal series resonant capacitance and parallel parasitic capacitance external to the series circuit due to the proximity of conductors that connect to the crystal itself. The resonant frequency is also determined by the series resonance which is mechanically determined by the physical dimensions of the piezoelectric crystal itself.

The internal series resonant capacitance (Ci) is very small, on the order of femto or atto farads, much less than the external parallel capacitance (Ce) which is usually in pico farads. Since both capacitances are in series with respect to the motional/series inductance, moderate changes in the much larger external capacitance have a very small effect on the total capacitance (Ct). The formula for capacitances in series is: Ct=1/Ci+1/Ce. As can be seen, if the external capacitance (Ce) is orders of magnitude larger, then its reciprocal becomes a very small fraction of the total capacitance. Hence, the external parallel capacitance affects the resonant frequency to a much lesser degree than the internal equivalent series resonant capacitance (Ci), but is very useful for fine adjustment of the resonant frequency.

Crystal oscillators as used in integrated circuits (ICs) typically use a CMOS inverter 167 with inverting gain. A frequency determining network, either LC, ceramic, or crystal resonator, outside of the IC inverter and connected to both its output and input, is used to control the frequency.

The requirements for oscillation are regenerative non-inverting feedback and enough gain around the total loop to ensure regeneration. The loop consists of the inverter 167 that supplies the gain, and the external resonator 160 that feeds the inverter output back into the inverter's input 169. The resonator is the loss that the inverter must offset in order to oscillate. Since the inverter 167 supplies inverting gain, the external resonator must also invert the feedback so that the total loop is non-inverting. To accomplish this feedback inversion, a circuit is configured that has two external capacitors 171, 173 in units to tens of pF, both to ground, and the resonator 160 across the top from input to output. With this configuration, the circuit has the appearance of the letter "pi" and is therefore referred to herein as a "pi network". The two external capacitors in addition to the parallel capacitance of the crystal resonator form the total external parallel capacitance as mentioned above.

The circulating current in the resonator network is much larger than any current that the inverter is capable of producing. Hence, the loop current 175 dominates. When, at an instant in time, the loop current 175 is clockwise around the pi network, the capacitor 171 on the left/input will be transitioning negatively, while the capacitor 173 on the right/output is transitioning positively. Thus, opposite sides of the pi network have opposite polarities of signal. This is the necessary second inversion mentioned above as needed for oscillation.

In order to minutely adjust the oscillation frequency to meet the ranging requirements of the present radial wireless fence invention, the three external capacitances, which constitute most of the total parallel capacitance external to the resonator, can be increased or decreased. If the frequency is too high, the capacitance can be increased, and vice versa.

According to the first collar modification embodiment of the present invention shown in the block diagram of FIG. 7B and in the schematics of FIGS. 7C and 7F, an oscillator configuration with specified pi network capacitances, such as that in a NANOLOC™ RF circuit, may be obtained by adding a small trimmer capacitor 166 across the top of the pi network to adjust the frequency of the first oscillator 160. Because the addition of the trimmer capacitor 166 will exceed the specified total capacitance for the pi network, the capacitance of the pi network is reduced by double the amount of the center capacitance of the trimmer. Doubling is necessary because the two pi capacitors are in series, so that their total capacitance is approximately half of the capacitor values. As an example, the existing NANOLOC™ RF circuit uses two 18 pF capacitors for the pi network. In order to use a 1-5 pF trimmer having a center value of 3 pF, the capacitance of the pi capacitors is reduced by twice that, or by 6 pF each for an actual value of 12 pF. As modified to include the trimmer capacitor, the circuit now yields 20 ppm of total adjustment range, which enables the desired degree of precision to be obtained.

The tuner can 168 shielding the NANOLOC™ chipset 158 and the first oscillator 160 has insufficient room to house the trimmer 166. Therefore, the trimmer 166 is preferably mounted to the PCB 65 outside the can 168 and short wires or PCB traces 169 are brought outside of the can to connect to the trimmer. The trimmer capacitor 166 can be secured to the PCB by gluing or soldering as would be known by persons of ordinary skill in the art.

To set the trimmer 166, a frequency counter is connected to the oscillator test point on the NANOLOC™ integrated circuit. The trimmer 166 is then adjusted to bring the frequency of the first oscillator 160 within specification (+/−5 ppm). Preferably, the frequency of oscillator 160 is well within the +/−5 ppm specification, allowing for some temperature related drift. Trimmer capacitors suitable for use with the NANOLOC™ chipset as used in the wireless fence system described herein are available from AVX Corporation of Fountain Inn, S.C.

Figure 7G:
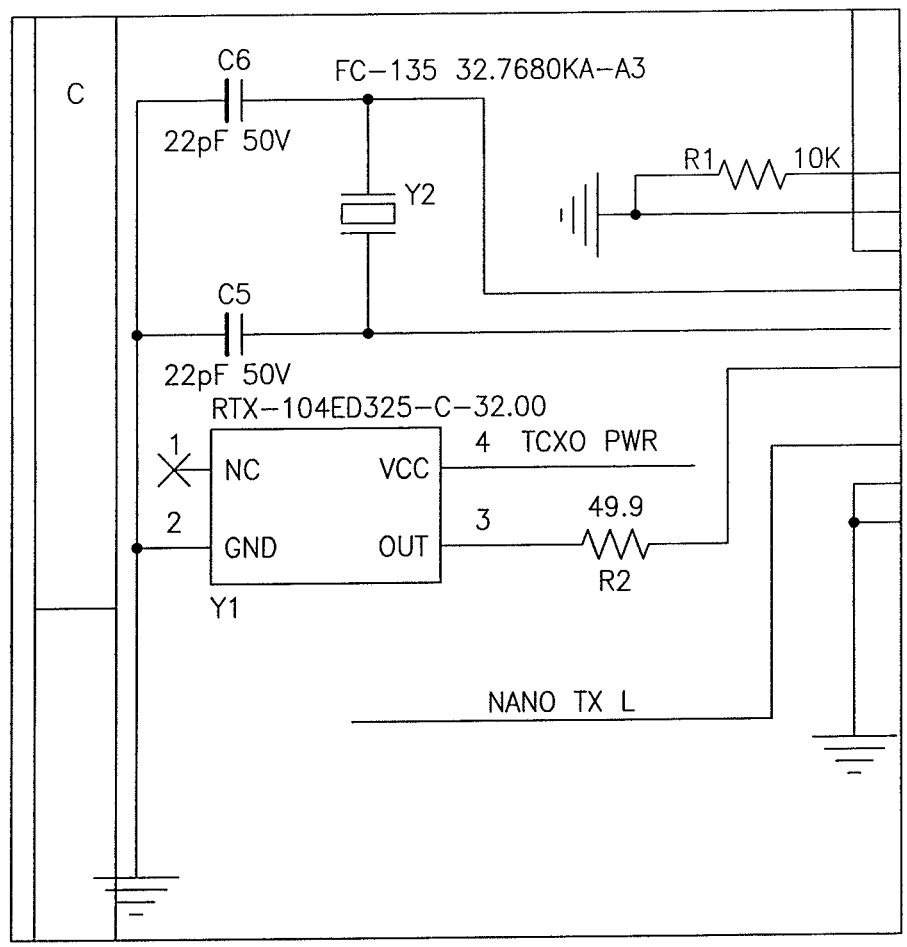
FIG. 7G is a more detailed schematic of the TCXO circuit in accordance with the present invention.

According to a second collar modification embodiment shown in the block diagram of FIG. 7D and the schematics of FIGS. 7E and 7G, the component for reducing clock speed variation is a temperature compensated crystal oscillator (TCXO) 170. As compared with the variation found when using a standard oscillator, such as that sold by Hosonic Electronic Co. Ltd, as the first crystal oscillator 160, the TCXO 170 provides reduced variation in the clock output of the collar RF circuit when the collar is subjected to a range of temperatures, Specifically, the clock output of the Hosonic crystal oscillator may vary by as much as +/−15 ppm at room temperature. When subjected to a range of temperatures, such as 0° C. to 50° C., the potential variation of the Hosonic crystal oscillator is +/−30 ppm (+/−960 Hz). The TCXO 170, over the same range of temperatures, preferably varies by a maximum of 50 Hz, conforming to a specified clock speed tolerance of +/−2 ppm (64 Hz). At room temperature, the TCXO 170 has a clock speed tolerance of 1.5 ppm. TCXOs suitable for incorporation within the NANOLOC™ integrated circuit as part of the collar circuitry of the present invention are available from FOX Electronics of Fort Meyers, Fla., and Raltron Electronics of Miami, Fla., as well as other manufacturers of electronics. The base unit may also be modified to include a TCXO in place of the Hosonic oscillator.

To modify the collar circuitry to include the TCXO, the software in the integrated circuit of the NANOLOC™ chipset is modified to disable the resident circuit for the first crystal oscillator 160, bypassing such circuit in order to use the output from the TCXO directly.

The fence components of the present invention may be modified with either the trimmer capacitor 166 or the TCXO 170 to minimize communication errors between the base unit and the collar. Modifying the collar with the TCXO is advantageous when the fence system is being used in geographical areas that see significant temperature variation with respect to indoor versus outdoor temperatures in both summer and winter. The base unit is preferably modified with the trimmer capacitor but may be equipped with a TCXO instead when outdoor use is anticipated. It is also possible to have a trimmer capacitor only in the collar, with no component for reducing clock speed variation in the base unit, if the clock speeds can be sufficiently matched.

Figure 8:
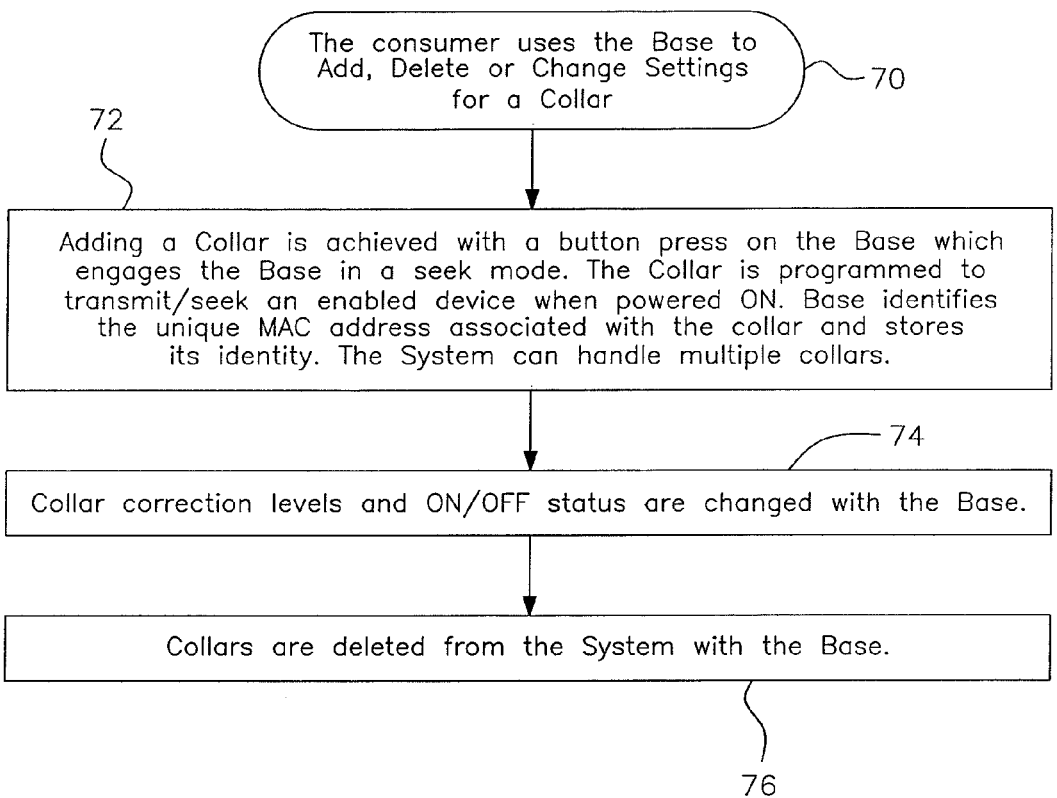
FIG. 8 is a flowchart showing the steps taken during the collar setting mode of the system shown in FIG. 1.

The collar 14 is set up for use with the fence system of the present invention using the base unit 12 as summarized in FIG. 8. The consumer can use the base unit to add, delete or change settings for the collar, step 70. To add another collar for another dog, step 72, the user presses one of the input buttons 26 on the base unit to place the base unit into a seek mode. When powered on, the collar is programmed to listen for and respond to a signal from an appropriate enabled device such as the base unit. Upon receiving the collar's response signal, the base unit identifies the unique media access control (MAC) address associated with the collar and stores its identity. Collar correction levels and the on/off status of the collar can also be changed using the base unit, step 74. In addition, collars can be deleted using the base unit, step 76.

Figure 9:
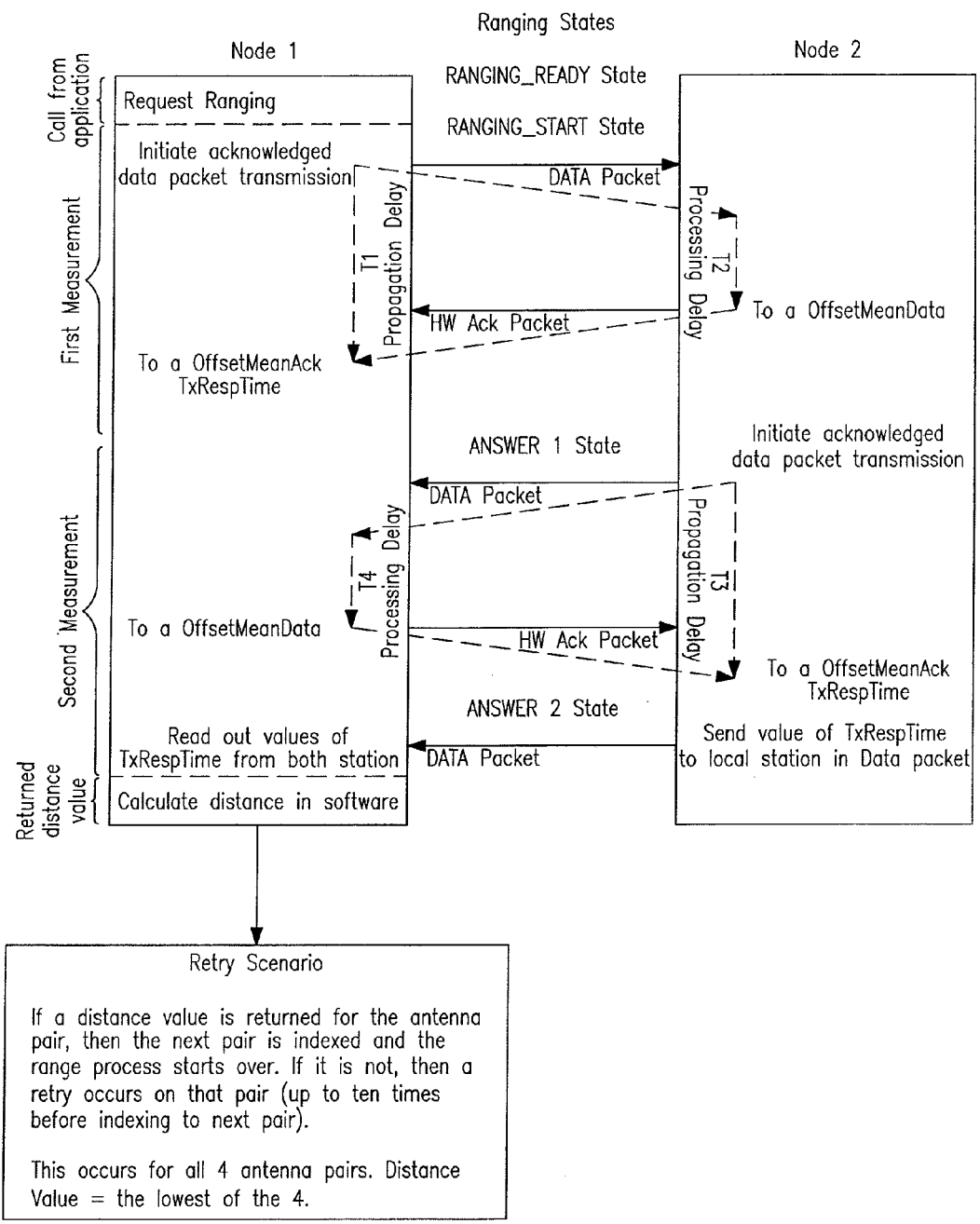
FIG. 9 is a flowchart showing the steps taken during the ranging process of the system shown in FIG. 1.

Once the collar has been set up and activated, the NANOLOC™ chipsets perform their ranging function to determine the distance between the base unit and the collar at any given time. The ranging process is as described in connection with the NANOLOC™ chipset on the NANOLOC™ website, and is summarized in FIG. 9. Ranging occurs on an ongoing basis unless the collar is asleep. The collar sleeps on lack of motion and wakes up when motion is detected by a motion sensor, such as an accelerometer, integrated with the collar.

In brief, the first antenna at the base unit determines a first distance value between itself and the first antenna on the collar, and then determines a second distance value between itself and the second antenna on the collar. The second antenna at the base unit then determines a third distance value between itself and the first antenna on the collar, and then determines a fourth distance value between itself and the second antenna on the collar. If all four distance values are successfully determined, the actual distance value used in terms of obtaining the current estimate of the dog's location is the shortest of the four measured values. This ranging process is more fully described in co-pending application Ser. No. 12/539,404, published as U.S. Publ. No. US 2010/0033339 on Feb. 11, 2010 ("the '339 application"). The '339 application is hereby incorporated by reference and considered part of the instant disclosure as if fully set forth herein in its entirety.

Having two antennas at each of the base unit and the collar improves the ratio of successfully received signal transmissions to lost signals as compared with single antenna systems. This improved ratio is particularly helpful in a household environment in which buildings, shrubs, vehicles and other objects can act to interfere with and/or block signal transmissions. Blocked signals can result in the unwanted issuance of a correction to the dog, i.e., the dog is corrected even though still within the prescribed boundary, or in escapes from the boundary if communication is sufficiently blocked.

The double antenna system also provides for dead zone detection and accommodation. A dead zone is defined as an area in which signal transmission may be lost or compromised. If such dead zones are not detected or otherwise taken into account, this omission can result in an unwanted correction being issued to the dog as the system may conclude from the lack of signal transmission that the dog is outside the boundary. A fuller discussion of the dead zone feature is set forth in the '339 application.

As summarized in FIG. 10, once set up, the wireless fence system 10 maintains a monitoring mode during which the base unit 12 displays information relating to the status of the battery charge level of the collar 14, the current distance value between the collar and the base, and whether a breach is detected, step 80. The base unit 12 may be configured during set-up to sound an alarm when a breach occurs. A breach is defined as having occurred when the distance value between the collar and the base unit is greater than or equal to the radius set up for the fence border, step 82. When a breach occurs, the system enters a correction mode as will be described further hereinafter.

To reduce the likelihood of an unwanted correction being administered to the dog, the system according to the present invention includes a tracking process which is summarized in FIG. 11. When performing the tracking process, a valid distance value is stored in flash memory at the base unit, step 90. However, the base and collar continually transmit and receive signals to calculate updated distance values on an on-going basis to track the dog in real time. During this ongoing process, particular distance values taken at any given time may be slightly inaccurate with respect to the actual location of the dog, indicating the dog to be in the trigger zone when, in fact, the dog is still inside the roaming area. These errant values, if taken on face value, would result in an unwanted correction being administered to the dog. Hence, the tracking process uses an improved Kalman filtering technique with hysteresis to "smooth out" consecutive distance values so that errant values caused by tolerances and attenuation will be ignored, step 92, and a more accurate tracking distance value obtained, step 100, as will be described more fully hereinafter.

The tracking process includes a normal battery conservation mode and an accelerated mode for the battery 56 of the collar 14. Whether the battery conservation mode is appropriate depends upon the difference between the distance value and the fence radius, step 93. If the difference between the distance value and the fence radius is greater than a threshold value, the tracking mode remains in the normal battery conservation mode in which the current range to the collar is checked every 500 ms, step 95. If, however, the difference between the distance value and the fence radius is less than the threshold value, indicating the dog to be nearing the fence or border, the system enters a fast range mode in which the range is checked every 100 ms, step 97. This use of different sampling rates allows for greater battery conservation through less frequent sampling when warranted by the dog's position without sacrificing accurate tracking obtained through accelerated sampling as the dog approaches the fence 31 and trigger zone 34.

As already described, the tracking process also continually compares the distance value associated with the collar with the fence radius, step 94, and, if the distance value is less than the fence radius, no action is taken, step 96. If the distance value is greater than the fence radius, however, a correction sequence is commenced, step 98.

As summarized in FIG. 12, the correction process begins when the base unit sends a command to the collar to correct, step 110. Upon receipt of this command, the collar is activated and issues a correction in the form of a tone and/or physical correction, step 112. The correction continues until a set time-out period has been reached, step 114, or until the dog returns approximately 10 feet within the roaming area, step 116. If the time-out period has been reached, step 114, the correction stops, step 118. If the time-out period has not been reached, step 114, and the dog has returned within the roaming area, step 118, the correction also stops. If, however, the time-out period has not been reached and the dog has not returned, step 116, the correction continues, step 112. The length of the time out period can be varied, but according to one preferred embodiment the time out period is about 30 seconds. The extent to which the dog must return within the roaming area before the correction is stopped could also be more or less than 10 feet according to system design and settings.

To perform the "smoothing out" of consecutive distance values to avoid inadvertent correction of the dog, various types of filtering algorithms may be employed to filter the distance values. In a preferred embodiment, the system according to the present invention uses an enhanced Kalman filtering technique such as described in a paper entitled, "An Introduction to the Kalman Filter" by Greg Welch and Gary Bishop in the Department of Computer Science at the University of North Carolina at Chapel Hill.

As a means of further smoothing out consecutive distance values and of detecting and ignoring anomalous values, the Kalman filtering algorithm used according to the present invention assigns a weight to each measured distance value according to the apparent reliability or confidence of the measurement sample. The confidence of the measurement sample is determined on the basis of a comparison made between the currently measured distance value and the previously estimated distance value as determined by the Kalman filtering algorithm. If the difference between the currently measured distance value and the previously estimated distance value is greater than a predetermined threshold, then the currently measured distance value is considered to be suspect, i.e., to have limited confidence, and is given little weight. This situation may be illustrated by the following example. The previously estimated distance value between the dog and the base unit was 10 feet and the currently measured distance value, taken a second later, indicates the dog to be 30 feet away from the base unit. The currently measured distance value would appear to be errant since, clearly, the dog could not have covered that much distance in the time that elapsed. A currently measured distance value that represents a realistic movement change, i.e., that shows a position change less than the threshold, is given greater weight when used to calculate an updated estimated distance value from the base unit to the dog.

The confidence of the measurement sample may also be evaluated using both a comparison between the currently measured distance value and the previously estimated distance value, and an output of an accelerometer on the collar. If the delta between the currently measured distance value and the previously estimated distance value is large and "high" acceleration is also reported, then the value is given greater weight, i.e., is considered more reliable. If, on the other hand, a large range delta is accompanied by little or no acceleration, then the value is given little weight or ignored as likely representing a bad range value.

It should be noted that the converse of the above identified relationship does not necessarily hold true. For example, a low delta in range values does not become more or less reliable when accompanied by low acceleration reporting due to the incidence of tangential motion under high acceleration. But including the input of the accelerometer may be beneficial when evaluating motion radiating toward or away from the base unit.

The present invention further achieves enhanced robustness in adverse conditions through strength enhancement of the signals being exchanged between the collar and the base unit. This strength enhancement, or signal amplification, allows the base unit and collar to conduct the ranging and tracking processes more accurately than is possible with just the conventionally configured NANOLOC™ chipsets when operating in a household environment where buildings, shrubs, vehicles, etc., can interfere with signal receipt and transmission. According to a preferred embodiment, power amplification circuitry is integrated to work with the NANOLOC™ chipsets to provide greater signal strength.

The present invention may also be adapted to track the location of children, as well as other types of animals, through appropriate modification of the remote unit. For example, rather than a collar, a child could wear a wrist bracelet as the remote unit. The wrist bracelet is configured with a NANOLOC™ chipset like that in the collar already described herein. The wrist bracelet would not have a correction capability, however, but would provide continuous location information to the base unit, including the boundary breach alert signal, for use by the parent or other supervising adult as may be appropriate. Similarly, a harness or collar arrangement could be configured for other animals that, by providing distance information to the base station, would allow the owner to track the animal's location, with or without a correction capability as appropriate.

The foregoing descriptions and drawings should be considered as illustrative only of the principles of the invention. The invention may be configured in a variety of ways and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A wireless fence system for containing one or more dogs in a generally circular user-defined roaming area comprising:
   a base unit including a transceiver unit, an oscillator and a component for reducing clock speed variation, a location of said base unit defining a center point of said generally circular user-defined roaming area with a radius of said user-defined area being defined by a user during system set-up, an area outside said roaming area constituting a trigger zone;
   at least one collar worn by a dog, said collar including a strap for securing the collar to a dog's neck and a compartment connected to said strap containing a transceiver unit in signal communication with said base unit transceiver unit, said transceiver unit being incorporated within a PCB assembly contained within said compartment, said PCB assembly including a collar-mounted oscillator and a collar component for reducing clock speed variation between the collar and the base unit;
   said system configured to continuously obtain distance values between the base unit and the collar on a real time basis using said transceiver units and to calculate a current estimate of a distance between the dog and the base unit on an ongoing basis;
   said collar including a correction unit that initiates administration of a correction to the dog when the current estimate calculated by the system indicates the dog is in the trigger zone;
   said system being further configured to weight and filter a plurality of said continuously obtained distance values when calculating the current estimate and to assign less weight to distance values considered suspect due to disparity between said suspect distance values and previously measured distance values and previously calculated estimates of the distance between the dog and the base unit.

2. The wireless fence system as set forth in claim 1, wherein said component for reducing clock speed variation in said base unit is a trimmer capacitor for manually adjusting a frequency of said base unit oscillator to reduce clock speed variation and effectively eliminate communication errors between the base and the collar.

3. The wireless fence system as set forth in claim 2, wherein said component for reducing clock speed variation in said collar oscillator is a manually adjustable trimmer capacitor.

4. The wireless fence system as set forth in claim 3, wherein said trimmer capacitor in said base unit is adjustable to obtain a maximum clock speed variation between the base unit and the collar of +/−160 Hz for a total range precision of 10 ppm (+/−5 ppm).

5. The wireless fence system as set forth in claim 2, wherein said component for reducing clock speed variation in said collar oscillator is a manually adjustable trimmer capacitor, said trimmer capacitors in said base unit and said collar being adjustable to obtain a maximum clock speed variation between the base unit and the collar of +/−160 Hz for a total range precision of 10 ppm (+/−5 ppm).

6. The wireless fence system as set forth in claim 1, wherein said strap includes a first strap part connected to one side of said compartment and a second strap part connected to an opposite side of said compartment, said strap parts being configured to fasten said collar around a dog's neck, said collar including at least one antenna inserted into a blind channel in one of said first and second strap parts, a free end of said antenna protruding from one of the strap parts being received within said compartment and coupled to connectors on said PCB assembly.

7. The wireless fence system as set forth in claim 6, wherein said collar includes two antennas, each antenna being inserted into a blind channel of a respective one of the first and second strap parts, free ends of both said antennas protruding from the strap parts and being received within said compartment and coupled to connectors on said PCB assembly.

8. The wireless fence system as set forth in claim 7, wherein said compartment includes an upper housing and a lower housing, said PCB assembly and the free ends of said strap parts being received within said lower housing, and said upper housing being sealed to said lower housing so that said collar is waterproof.

9. The wireless fence system as set forth in claim 1, wherein said strap includes a center portion having two cutouts spaced from one another to receive two screw bosses extending outwardly from a bottom of said compartment which pass through said cutouts, said collar strap being secured to said compartment by passing said screw bosses through said cutouts, sliding grommets onto the screw bosses and against the strap, and screwing electrodes onto the screw bosses and in abutment with said grommets.

10. The wireless fence system as set forth in claim 9, wherein said compartment has two antennas projecting from each end thereof, each of said antennas being enclosed within an insulating sleeve to protect said antennas from environmental exposure.

11. The wireless fence system as set forth in claim 10, wherein said collar strap has a pocket on either side of said strap center portion, each pocket receiving one of said two sleeved antennas when the strap and correction unit are assembled for use.

* * * * *